United States Patent [19]

Hasegawa et al.

[11] Patent Number: 4,812,642

[45] Date of Patent: Mar. 14, 1989

[54] OPTICAL COORDINATE SYSTEM INPUT DEVICE

[75] Inventors: Kazuo Hasegawa; Junichi Ohuchi; Hiroaki Sasaki, all of Furukawa, Japan

[73] Assignee: Alps Electric Co., Ltd., Japan

[21] Appl. No.: 8,625

[22] Filed: Jan. 29, 1987

[30] Foreign Application Priority Data

Apr. 24, 1986 [JP] Japan .................................. 61-95667
Jun. 30, 1986 [JP] Japan ................................. 61-153174
Jun. 30, 1986 [JP] Japan ................................. 61-153175
Jun. 30, 1986 [JP] Japan ................................. 61-153176

[51] Int. Cl.$^4$ ............................................. G01V 9/04
[52] U.S. Cl. ................................... 250/221; 250/205; 340/712; 341/5
[58] Field of Search .................... 250/221, 222.1, 205; 340/365 P, 706, 707, 555–557, 712

[56] References Cited

U.S. PATENT DOCUMENTS 4,313,109 1/1982 Funk et al. ........................... 250/221
4,645,920 2/1987 Carroll et al. ........................ 250/221
4,652,741 3/1987 Golborne ............................. 250/221

Primary Examiner—Edward P. Westin
Attorney, Agent, or Firm—Guy W. Shoup; Paul J. Winters; Stephen L. Malaska

[57] ABSTRACT

An optical coordinate system input device includes a plurality of light emitting elements aligned in X and Y directions and sequentially, selectively supplied with a drive current, and a plurality of light receptor elements opposed to the respective light emitting elements each receiving a light signal from opposed one of the light emitting elements. The device specifically includes an adjusting circuit to adjust the value of the drive current flowing in the light emitting elements.

10 Claims, 14 Drawing Sheets

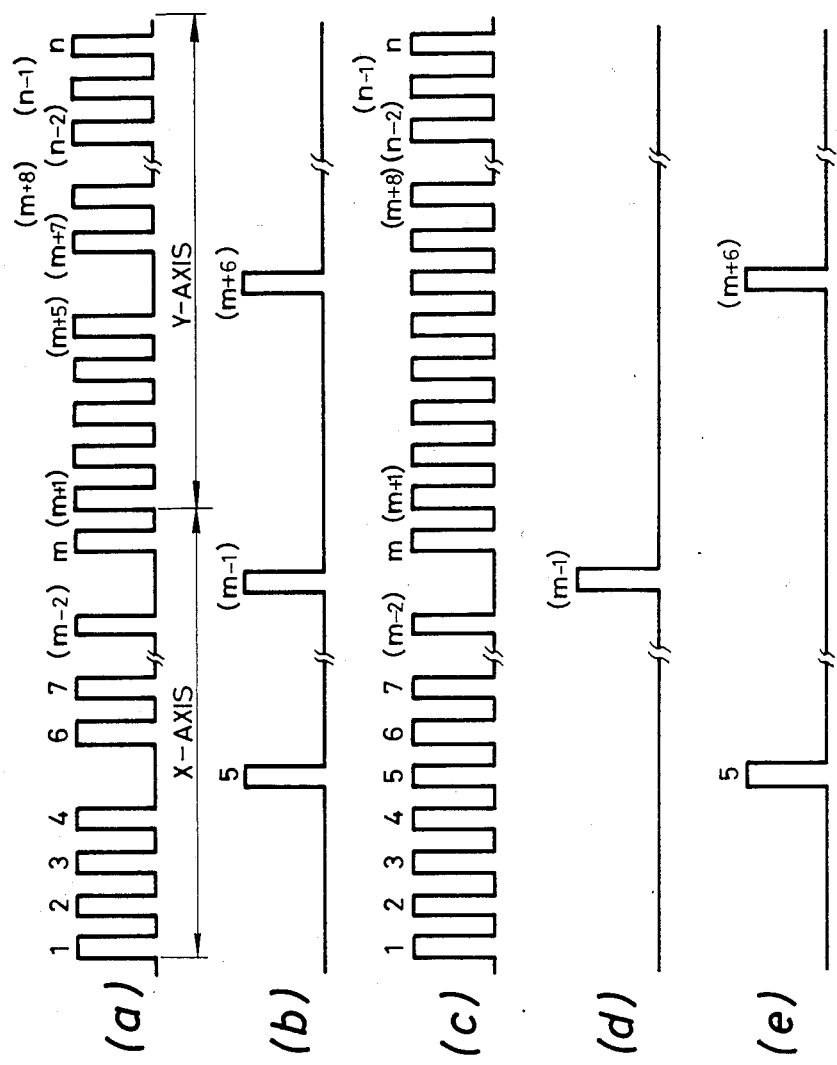

OPTICAL COORDINATE SYSTEM INPUT DEVICE

FIELD OF THE INVENTION

This invention relates to an optical coordinate system input device configured to prevent erroneous detection of positional input and more particularly to a device including means for adjusting the value of a drive current flowing in light emitting elements.

BACKGROUND OF THE INVENTION

As prior art technologies in the field of optical coordinate system input devices to which the present invention belongs, there are many inventions such as U.S. Pat. Nos. 3,764,813; 3,775,560; 3,860,754; 4,122,438; 4,198,623; 4,267,443; 4,301,447; 4,313,109; and 4,384,201.

Among these prior technologies, U.S. Pat. No. 4,243,879 (Arthur B. Carroll et al.) includes an erroneous detection preventive means to improve a problem in a light receptor and minimize erroneous operation of the device.

However, this type of optical coordinate system input device, when employed with manual input often fails to prevent erroneous operations.

One form of the prior art optical coordinate system input device involving various factors of erroneous operations is explained hereunder.

The optical coordinate system input device is attached on the front face of a display plane of a CRT display, LCD (liquid crystal display apparatus), etc., to operate in a scanning mode where respective light receptor elements sequentially receive light signals produced from respective light emitting elements. It is widely used as a coordinate system input device for a personal computer, etc. using a positional input corresponding to the position of a light signal blocked by a finger or other interposed object.

In this type of optical coordinate system input device, LED or other light emitting elements deteriorate and reduce their light emitting amounts in a relatively short time. Insufficient light emission also occurs when dust rests and accumulates on the light emitting elements. Since a decrease in the light emitting amounts inevitably invites a decrease in the light reception level of the light receptor elements, the personal computer, etc. often erroneously recognizes an input when no light signal is blocked on purpose by a finger or other object.

In the prior art technologies, light emitting elements are deemed to be deteriorated when a cursor can not be located on a predetermined position of the display plane of a CRT display or other image display apparatus. However, since an erroneous coordinate input is also caused by an erroneous operation of the personal computer or the CRT display, it is difficult to acknowledge whether the light emitting elements themselves are deteriorated or dusty, or the computer or the CRT display malfunctions. Therefore, a user may often fail to timely cope with deterioration of the light emitting elements, and this invites a serious situation of the computer system where a normal operator cannot effect his subsequent instruction.

In this connection, a recent proposal is the use of an attenuation filter made of an acrylic or other plate having a light transmission of about 50% and interposed between an array of light emitting elements and an array of light receptor elements to judge from the coordinate system input position on the display screen whether the receptor elements receive light signals above a predetermined level or not. Thereby, deterioration or dusty condition of the light emitting elements themselves is determined for subsequent exchange or cleaning thereof.

A second form of the prior art optical coordinate system input device is explained hereinbelow.

The optical coordinate system input device is disposed at the front face of a CRT display, LCD or other image display apparatus and activated to supply a coordinate position input to a computer. A number of pairs of light emitting elements and light receptor elements are opposed to each other along the outer peripheral margins of the screen of the CRT display, etc. so that the light emitting elements and light receptor elements are selectively scanned to detect any interruption of a light signal by a finger or other object during the scanning to obtain a coordinate system signal.

FIG. 11 is a block circuit diagram of the prior art optical coordinate system in which a number of light emitting diodes L1 through Ln are placed on two adjacent margins of the front face outer periphery of a CRT or other image display apparatus. Photo transistors PT1 through PTn employed as the light receptor elements are placed on the other two adjacent. margins and opposed to the light emitting diodes L1 through Ln. Horizontally opposed pairs of light emitting diodes (L1 through Lm) and photo transistors (PT1 through PTm) form X axes of the coordinate system, and vertically opposed pairs of light emitting diodes (Lm+1 through Ln) and photo resistors (PTm+1 through PTn) form Y axes of the coordinate system. Cathodes of the light emitting diodes L1 through Ln and emitters of the photo resistors PT1 through PTn are all connected to ground. Anodes of the light emitting diodes L1 through Ln are connected to respective ends of normally opened switching elements SL1 through SLn which have the other ends connected in common to the emitter of a driving transistor Q. Including these switching elements SL1 through SLn, a first switching circuit 1 is formed. The collectors of the photo transistors PT1 through PTn are connected to respective ends of normally opened switching elements S1 through Sn which have the other ends connected in common to a waveform shaper 2. Including these switching elements S1 through Sn, a second switching circuit 3 is formed.

A start signal Sc is applied to the driving transistor Q and a counter circuit 4 from a host computer (not shown). The counter circuit 4 starts its counting motion in response to the start signal Sc to produce a pulse signal P on every count and supply a count data Dc. The pulse signal P is applied to the first and second switching circuits 1 and 3 so that a decoder or other means (not shown) sequentially, correspondingly closes respective pairs of switching elements S1 and SL1, S2 and S12, et seq. to the final ones Sn and SLn so as to sequentially activate the light emitting diodes L1 through Ln to produce light signals. The driving transistor Q having received the start signal Sc is now conductive. The photo transistors PT1 through PTn are sequentially made conductive by light reception from associated light emitting diodes L1 through Ln unless a light signal is blocked by a finger or other object, but they are maintained nonconductive if the light signal thereto is blocked. The waveform shaper 2 produces a waveform as shown in FIG. 12(a), depending on conduction or nonconduction of the photo transistors PT1 through PT2. The waveform of FIG. 12(a) is produced with light signals from the light emitting diodes L5 and L(m+6) are blocked.

The output of the waveform shaper 2 is amplified by an amplifier 5 and subsequently applied to a comparator 6. The comparator 6 also receives the pulse signal P from the counter circuit 4, and produces a memory signal Sm if it does not receive the output from the waveform shaper 2 at the moment when the pulse signal P is entered therein. FIG. 12(b) shows a waveform produced by the comparator 6 in which the memory signal Sm is outputted at "5" in the X axis and "m+6" in the Y axis.

The memory signal Sm is applied to a memory 7 which responsively stores the count data Dc from the counter circuit 4. The count data Dc is further applied to an output controller 8 which calculates a proper coordinate from the count data Dc and supplies a corresponding coordinate signal to the host computer.

A third form of the prior art optical coordinate system input device is explained hereinbelow, referring to FIG. 13. A number of light emitting diodes L1 through Ln are placed on two adjacent margins of the front face outer periphery of a CRT or other image display apparatus. Photo transistors PT1 through PTn employed as the light receptor elements are placed on the other two adjacent margins and individually opposed to the light emitting diodes L1 through Ln. Horizontally opposed pairs of light emitting diodes (L1 through Lm) and photo transistors (PT1 through PTm) form X axes of the coordinate system, and vertically opposed pairs of light emitting diodes (Lm+1 through Ln) and photo resistors (PTm+1 through PTn) form Y axes of the coordinate system. Cathodes of the light emitting diodes L1 through Ln and emitters of the photo resistors PT1 through PTn are all connected to ground. Anodes of the light emitting diodes L1 through Ln are connected to respective ends of normally opened switching elements SL1 through SLn which have the other ends connected in common to the emitter of a driving transistor Q1. Including these switching elements SL1 through SLn, a first switching circuit 1 is formed. Collectors of the photo transistors PT1 through PTn are connected to respective ends of normally opened switching elements S1 through Sn which have the other ends connected in common to a waveform shaper 2. Including these switching elements S1 through Sn, a second switching circuit 3 is formed. The collector of the driving transistor Q1 is connected to a driving power source V. The light emitting diodes L1 through Ln, first and second switching circuits 1 and 3, waveform shaper 2 and driving transistor Q1 form a coordinate system detector.

The waveform shaper 2 is arranged as explained hereinbelow. The other ends of the switching elements S1 through Sn are connected together, and their junction is further connected to the base of a transistor Q2 via a capacitor C1. The emitter of the transistor Q2 is connected to ground, and the collector thereof is connected to the driving power source V via series-connected resistors R1 and R2. The base of the transistor Q2 is connected to the driving power source V via a resistor R3. The junction of the resistors R1 and R2 is connected to a common junction of the other ends of the switching elements S1 through Sn. The collector of the transistor Q2 is connected to an amplifier 4a via a capacitor C2. When one of the photo transistors PT1 through PTn decreases in impedance on reception of a light signal, the voltage at the common junction of the other ends of the switching elements S1 through Sn drops. The drop of the output terminal voltage is inverted and amplified in the transistor Q2, and a pulse output is applied to the amplifier 4a.

A start signal Sc is applied to the driving transistor Q1 and a counter circuit 5a from a host computer (not shown). The counter circuit 5a starts its counting motion in response to the start signal Sc to supply a pulse signal P to the first and second switching circuits 1 and 3 and a comparator 6 on every count and to supply a count data Dc to a memory 7. The first and second switching circuits 1 and 3 are activated in response to the pulse signal P so that a decoder or other means (not shown) correspondingly closes respective pairs of switching elements S1 and SL1, S2 and S12, et seq. to the final ones Sn and SLn so as to sequentially activate the light emitting diodes L1 through Ln to produce light signals. The driving transistor Q1 having received the start signal Sc is now conductive. The photo transistors PT1 through PTn decrease in impedance and hence in output terminal voltage due to reception of light signals from opposed light emitting diodes L1 through Ln unless the light signals are blocked by a finger or other object. A pulse output is supplied from the waveform shaper 2 to the amplifier 4a. When the light signals are blocked and cannot reach the photo transistors PT1 through PTn, no pulse output is applied to the amplifier 4a from the waveform shaper 2. The output of the waveform shaper 2 is amplified in the amplifier 4 and applied to the comparator 6 for comparison with the pulse signal P from the counter circuit 5a. If the comparator 6 does not receive the pulse output from the amplifier 4a at the moment when the pulse signal P is entered, it applies a memory signal Sm to the memory 7 which responsively stores the count data Dc from the counter circuit 5a. The count data Dc is further applied to an output controller 8 which calculates a proper coordinate from the count data Dc and supplies a corresponding coordinate signal to the host computer.

A fourth form of the prior art optical coordinate system input device is explained hereinbelow, referring to FIG. 14.

A number of light emitting diodes L1 through Ln are placed on two adjacent margins of the front face outer periphery of a CRT or other image display apparatus. Photo transistors PT1 through PTn employed as the light receptor elements are placed on the other two adjacent margins and opposed to the light emitting diodes L1 and Ln. Horizontally opposed pairs of light emitting diodes (L1 through Lm) and photo transistors (PT1 through PTm) form X axes of the coordinate system, and vertically opposed pairs of light emitting diodes (Lm+1 through Ln) and photo resistors (PTm+1 through PTn) form Y axes of the coordinate system. Cathodes of the light emitting diodes L1 through Ln and emitters of the photo resistors PT1 through PTn are all connected to ground. Anodes of the light emitting diodes L1 through Ln are connected to respective ends of normally opened switching elements SL1 through SLn which have the other ends connected in common to the emitter of a driving transistor Q1. Including these switching elements SL1 through SLn, a first switching circuit 1 is formed. The collectors of the photo transistors PT1 through PTn are connected to respective ends of normally opened switching elements S1 through Sn which have the other ends connected in common to a waveform shaper 2.

Including these switching elements S1 through Sn, a second switching circuit 3 is formed. The collector of the driving transistor Q1 is connected to a driving power source V. The light emitting diodes L1 through Ln, first and second switching circuits 1 and 3, waveform shaper 2 and driving transistor Q1 form a coordinate system detector.

The waveform shaper 2 is arranged as explained hereinbelow. The other ends of the switching elements S1 through Sn are connected together, and their junction is further connected to the base of a transistor Q2 via a capacitor C1. The emitter of the transistor Q2 is connected to ground, and the collector thereof is connected to the driving power source V via series-connected resistors R1 and R2. The base of the transistor Q2 is connected to the driving power source V via a resistor R3. The junction of the resistors R1 and R2 is connected to a common junction of the other ends of the switching elements S1 through Sn. The collector of the transistor Q2 is connected to an amplifier 4a via a capacitor C2. When one of the photo transistors PT1 through PTn decreases in impedance on reception of a light signal, the voltage at the common junction of the other ends of the switching elements S1 through Sn drops. The drop of the output terminal voltage is inverted and amplified in the transistor Q2, and a pulse output is applied to the amplifier 4a.

A start signal Sc is applied to the driving transistor Q1 and a counter circuit 5a from a host computer (not shown). The counter circuit 5a starts its counting in response to the start signal Sc to supply a pulse signal P to the first and second switching circuits 1 and 3 and a comparator 6 on every count and to supply a count data Dc to a memory 7. The first and second switching circuits 1 and 3 are activated in response to the pulse signal P so that a decoder or other means (not shown) sequentially, correspondingly closes respective pairs of switching elements S1 and SL1, S2 and S12, et seq. to the final ones Sn and SLn so as to sequentially activate the light emitting diodes L1 through Ln to produce light signals. The driving transistor Q1 having received the start signal Sc is now conductive. The photo transistors PT1 through PTn decrease in impedance and hence in output terminal voltage due to reception of light signals from associated light emitting diodes L1 through Ln unless the light signals are blocked by a finger or other object, so that a pulse output is supplied from the waveform shaper 2 to the amplifier 4a. When the light signals are blocked and cannot reach the photo transistors PT1 through PTn, no pulse output is applied to the amplifier 4a from the waveform shaper 2. The output of the waveform shaper 2 is amplified in the amplifier 4a and applied to the comparator 6 for comparison with the pulse signal P from the counter circuit 5a. If the comparator 6 does not receive the pulse output from the amplifier 4a at the moment when the pulse signal P is entered, it applies a memory signal Sm to the memory 7 which responsively stores the count data Dc from the counter circuit 5a. The count data Dc is further applied to an output controller 8 which calculates a proper coordinate from the count data Dc and supplies a corresponding coordinate signal to the host computer.

A fifth form of the prior art optical coordinate system input device is explained hereinbelow, referring to FIG. 15.

A number of light emitting diodes L1 through Ln are placed on two adjacent margins of the front face outer periphery of a CRT or other image display apparatus. Photo transistors PT1 through PTn employed as the light receptor elements are placed on the other two adjacent margins and opposed to the light emitting diodes L1 and Ln. Horizontally opposed pairs of light emitting diodes (L1 through Lm) and photo transistors (PT1 through PTm) form X axes of the coordinate system, and vertically opposed pairs of light emitting diodes (Lm+1 through Ln) and photo resistors (PTm+1 through PTn) form Y axes of the coordinate system. Cathodes of the light emitting diodes L1 through Ln and emitters of the photo resistors PT1 through PTn are all connected to ground. Anodes of the light emitting diodes L1 through Ln are connected to respective ends of normally opened switching elements SL1 through SLn which have the other ends connected in common to the emitter of a driving transistor Q1. Including these switching elements SL1 through SLn, a first switching circuit 1 is formed. The collectors of the photo transistors PT1 through PTn are connected to respective ends of normally opened switching elements S1 through Sn which have the other ends connected in common to a waveform shaper 2. Including these switching elements S1 through Sn, a second switching circuit 3 is formed. The collector of the driving transistor Q1 is connected to a driving power source V. The light emitting diodes L1 through Ln, first and second switching circuits 1 and 3, waveform shaper 2 and driving transistor Q1 form a coordinate system detector.

When a central operational processing unit (CPU) supplies a switching signal a in response to an instruction supplied from a host computer (not shown), the first and second switching circuits 1 and 3 sequentially, correspondingly close respective pairs of switching elements S1 and SL1, S2 and S12, et seq. to final ones Sn to SLn. The driving transistor Q1 having received a driving signal b from the CPU 4' at the base thereof is now conductive. The driving signal b may be a series of several pulses supplied from the CPU while the pairs of switching elements S1 through Sn and SL1 through SLn are sequentially closed. When one of the photo transistors PT1 through PTn receives a light signal from associated one of the selectively driven photo diodes L1 through Ln, the wave form shaper 2 produces a pulse signal. If the selected one of the photo transistors PT1 through PTn cannot receive the light signal due to a positional instruction by a finger or other blocker, the waveform shaper does not produce a pulse signal. The signal from the waveform shaper 2 is amplified in an amplifier 5' and applied to the CPU 4' which obtains therefrom the positional signal input by a finger or other means.

OBJECT OF THE INVENTION

The use of an attenuation filter in the first type of prior art device has the problem that the attenuation filter may damage the optical coordinate input device during inspection. Further, different sizes of the attenuation filter must be prepared for various sizes of optical coordinate system input devices. Additionally, the attenuation filter can change in light transmission ratio due to stains and deterioration thereof, and hence requires careful maintenance.

It is therefore a first object of the invention to provide an optical coordinate system input device not using the attenuation filter but reliably detecting deterioration or stains of light emitting elements.

In the second type of prior art optical coordinate system input device, if one of the photo transistors PT1 through PTn does not receive a light signal due to some default disturbing the light signal supply from the associated one of the light emitting diodes L1 through Ln, the device judges that the light signal is blocked by a finger or other means and is activated accordingly. Therefore, the memory 7 stores a count data Dc corresponding to the light emitting diode in error, and the output controller 8a supplies an erroneous coordinate to the host computer. Such a malfunction will increase in a system having a large-scaled image display screen which includes a larger number of light emitting diodes.

It is therefore a second object of the invention to provide an optical coordinate system input device which prohibits storage of a count data corresponding to the light emitting diode in error to ensure a proper operation despite the presence of inoperative light emitting elements.

In the third type of prior art optical coordinate system input device, respective light emitting diodes L1 through Ln and respective photo transistors PT1 through PTn are different in characteristics. This invites variation in the amounts of respective light signals from the light emitting diodes L1 through Ln and change of respective impedances of the photo transistors PT1 through PTn which receive these light signals. This further invites variation in the output terminal voltages of the photo transistors PT1 through PTn. Therefore, it is necessary to supply a significantly larger drive current exceeding a normally required value (see the hatched portions in FIG. 10) to supply higher output light signals so that variation in the output terminal voltages of the photo transistors PT1 through PTn does not cause the waveform shaper 2 to fail to produce a pulse output. This accelerates deterioration of the light emitting diodes and increases the power consumption.

It is therefore a third object of the invention to provide an optical coordinate system input device configured to maintain a fixed value of output terminal voltages of the light receptor elements which receive light signals from light emitting elements.

In the fourth type of prior art optical coordinate system input device, respective light emitting diodes L1 through Ln and respective photo transistors PT1 through PTn are different in characteristics. This invites variation in the amounts of respective light signals from the light emitting diodes L1 through Ln and change of respective impedances of the photo transistors PT1 through PTn in receipt of these light signals. This further invites variation in the output terminal voltages of the photo transistors PT1 through PTn. Therefore, it is necessary to supply a significantly larger drive current exceeding a normally required value (see the hatched portions in FIG. 10) to supply higher output light signals so that variation in the output terminal voltages of the photo transistors PT1 through PTn does not cause the waveform shaper 2 to fail to produce a pulse output. This accelerates deterioration of the light emitting diodes and increases the power consumption.

It is therefore a fourth object of the invention to provide an optical coordinate system input device configured to maintain a fixed value of output terminal voltages of the light receptor elements which receive light signals from light emitting elements.

In the fifth type of prior art optical coordinate system input device, the light emitting diodes L1 through Ln are aligned along the front outer periphery of the screen of a CRT display or other image display apparatus, and have different positions. This leads to a difference in the lengths of lead wires or patterns on a printed circuit board which supply the drive current to the light emitting diodes L1 through Ln. This further invites variation in the resistance values which causes variation in the driving current flowing in the light emitting diodes L1 through Ln as shown in FIG. 10 to cause variation in the magnitude of light signals. Therefore, it is necessary to fix a lower limit of the drive current to lift the level of the smallest light signal above a predetermined necessary level. This inevitably invites an unnecessarily large flow of the drive current in many light emitting diodes, and not only accelerates deterioration thereof but also increases the power consumption. In a system having a large-scaled image display apparatus which includes a larger number of light emitting diodes L1 through Ln, the number of lead wires or patterns on a printed circuit board also increases. This inevitably decreases the cross-sectional areas of the lead wires or patterns and hence increases their resistances. Additionally, their positional differences become significant. Therefore, the larger is the screen of the image display apparatus, the larger is the variation in the drive current flowing in the light emitting diodes L1 through Ln.

It is therefore a fifth object of the invention to provide an optical position input device which is configured to supply a fixed current flow in the light emitting elements to produce a uniform output of light signals.

SUMMARY OF THE INVENTION

According to a general concept of the invention, an optical coordinate system input device generally comprises a plurality of light emitting elements, a plurality of light receptor elements opposed to the light emitting elements, a drive circuit supplying the light emitting elements with a drive current, and a switching circuit selectively connecting the drive circuit to the individual light emitting elements, and the invention device specifically includes an adjusting means for adjusting the current value flowing in the light emitting elements.

More specifically, a first technical proposal to attain the first object of the invention is the use of a switching means as the adjusting means which is closed to short-circuit an inspection resistor so that the drive circuit supplies a predetermined drive current to the light emitting elements. The switching means is opened upon inspection so that the inspection resistor controls the drive current for supply to the light emitting elements.

With this arrangement, any deterioration or stain of the light emitting diodes is reliably detected. Therefore, it is possible to find any deterioration or contamination of the light emitting elements, not by using an attenuation filter, but rather by using a simple circuit arrangement.

A second technical arrangement to attain the second object of the invention generally comprises a plurality of pairs of light emitting elements and light receptor elements opposed to each other, a counter circuit producing a pulse signal, a switching circuit responsive to the pulse signal to sequentially, selectively drive the pairs of light emitting elements and light receptor elements, and a memory for storing count data supplied from the counter circuit when one of the light receptor elements does not receive a light signal from the corresponding one of the light emitting elements selectively activated by the switching circuit so that a coordinate signal is obtained from the count data. The device specifically includes a detection means used as the current adjusting means to detect the presence or absence of a current flowing in the light emitting element selectively activated by the switching circuit to prohibit storage of the count data in the memory if the detection means does not detect any current.

With this arrangement, when a light signal is not received from a light emitting element due to its malfunction, the count data corresponding to the light emitting element in error is disregarded if no current exists in the light emitting element, and storage of the corresponding count data is prohibited. Therefore, the memory only stores count data correctly designating the coordinate input but others based on LED malfunction.

A third technical arrangement to attain the third object of the invention generally comprises a plurality of pairs of light emitting elements and light receptor elements opposed to each other, and a switching circuit sequentially and selectively activating the pairs of the light emitting elements and light receptor elements so that when one of the light receptor elements does not receive a light signal from the corresponding one of the light emitting elements selectively activated by the switching circuit, a coordinate signal indicating the non-reception of the light receptor element is produced. The device specifically includes a variable impedance circuit used as the adjusting means and connected in series to the light emitting elements. A negative feedback circuit receives at the input thereof an output terminal voltage of the light receptor element to adjust the variable impedance circuit to fix the value of the output terminal voltage of the receptor element. The devce further includes a memory circuit storing the feedback amount of the negative feedback control circuit for every pair of light emitting elements and light receptor elements, and a switching control circuit activating or inactivating the negative feedback circuit, so that scanning at the beginning of the operation causes the switching control circuit to activate the negative feedback circuit and activate the memory circuit to store the feedback amount. Subsequent scanning causes the switching control circuit to inactivate the negative feedback circuit, and the feedback amount is read out from the memory circuit to adjust the variable impedance circuit.

With this arrangement, the drive current to the light emitting elements is adjusted by the negative feedback circuit to make the output terminal voltages of the light receptor elements uniform. Further, the feedback circuit is activated by scanning at the beginning of the operation before any light signal is blocked by a coordinate input, and its feedback amount if stored in the memory circuit, whereas during a subsequent scan involving a possibility of blockage of light signals by a coordinate input, the variable impedance circuit is adjusted by the feedback amount taken from the memory circuit. Therefore, the light emitting elements are activated so that a fixed value of output terminal voltage is obtained from each light receptor element upon reception of a light signal.

A fourth technical arrangement to attain the fourth object of the invention generally comprises a plurality of pairs of light emitting elements and light receptor elements, wherein when one of the light receptor elements does not receive a light signal from the corresponding one of the light emitting elements selectively activated by the switching circuit, a coordinate signal indicating the non-reception of the light receptor element is produced. The device specifically includes a variable impedance circuit connected in series to the light emitting elements and used as the adjusting means; and a memory circuit which prestores an adjusting signal for every pair of light emitting element and light receptor element which adjusts the variable impedance circuit to make the output terminal voltages of the light receptor elements uniform. The memory circuit is operatively linked to the switching circuit to read the adjusting signal and accordingly adjust the variable impedance circuit.

With this arrangement, the light emitting elements are activated so that the receptor output terminal voltages produced by the light emitting elements at a fixed value regardless of variation in the characteristics of the light emitting elements and light receptor elements.

A fifth technical arrangement to attain the fifth object of the invention generally comprises a plurality of pairs of light emitting elements and light receptor elements opposed to each other, and a switching circuit sequentially, selectively activating the respective pairs of light emitting elements and light receptor elements, so that when one of the light receptor elements does not receive a light signal from the corresponding one of the light emitting elements selectively activated by the switching circuit, a coordinate signal indicating the non-reception of the light receptor elements is produced. The device specifically includes a drive means which drives the light emitting elements at a fixed current.

Due to the use of the drive current as the adjusting means, the light emitting elements never fail to produce light signals of a uniform magnitude, regardless of differences in the resistances of the lead wires and patterns on a printed circuit board due to differences in the lengths thereof caused by different positions of the light emitting elements.

The invention is hereinbelow described in detail, referring to some preferred embodiments illustrated in the drawings.

BRIEF DESCRIPTION OF THE DRAWINGS

FIG. 5 shows waveforms representing the operation of the circuit of FIGS. 4a and 4b;

DETAILED DESCRIPTION

Figure 1:
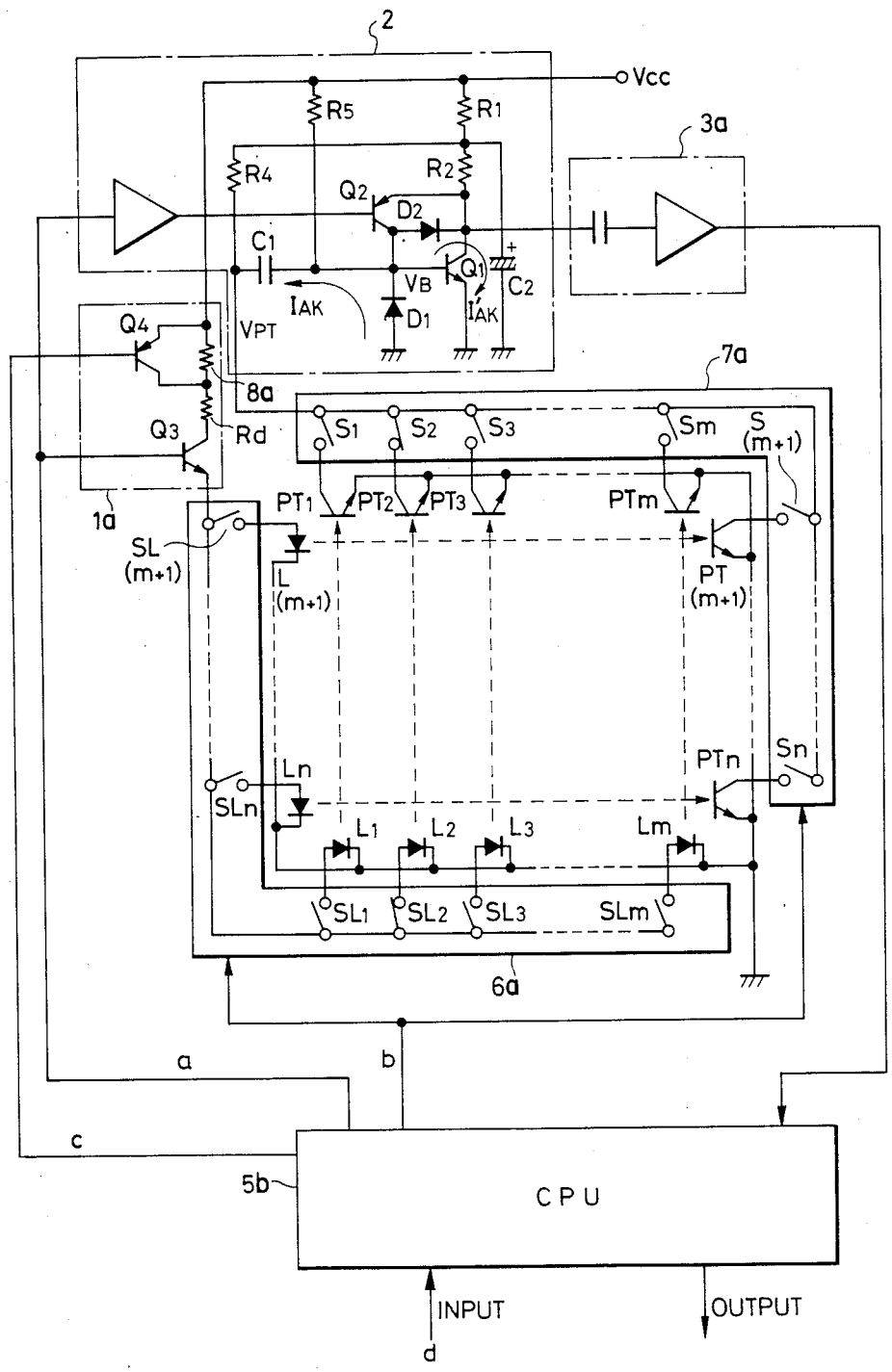
FIG. 1 is a circuit arrangement of a first embodiment of the invention.
Figure 2:
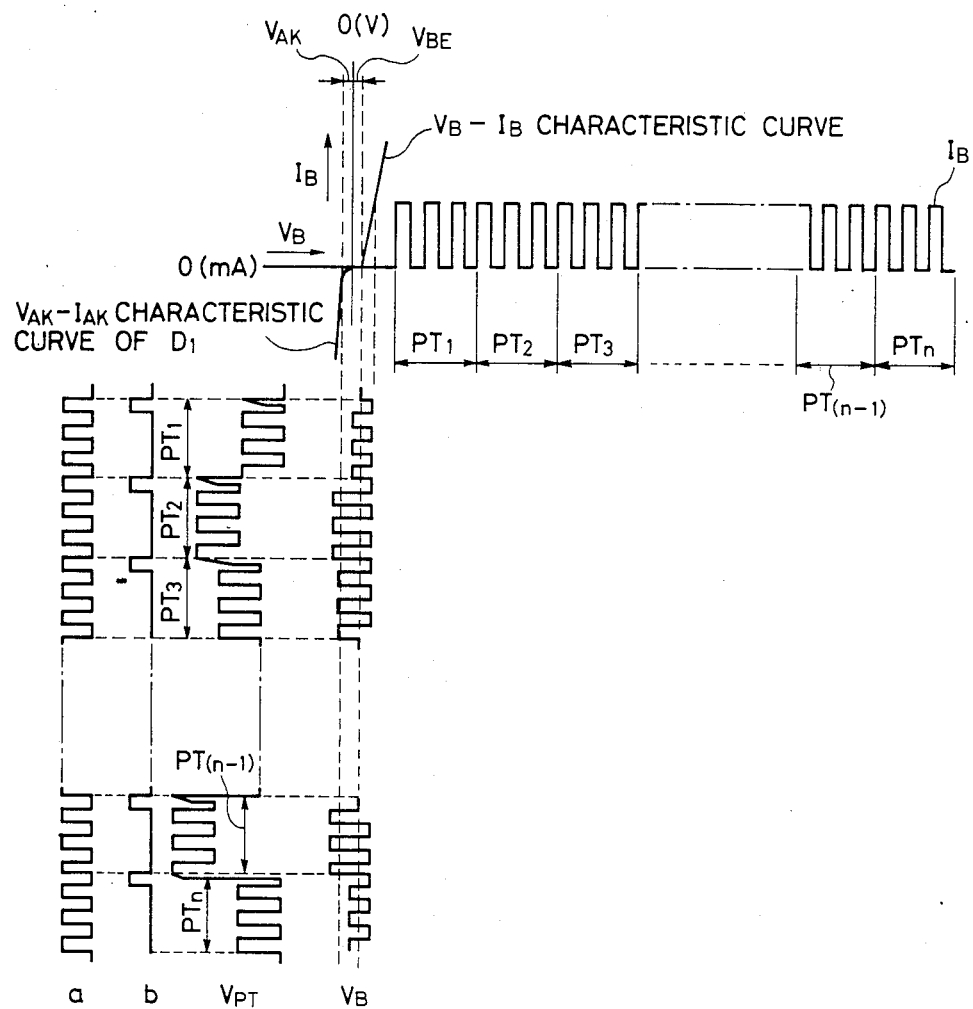
FIG. 2 shows waveforms in various points of the circuit of FIG. 1.
Figure 3:
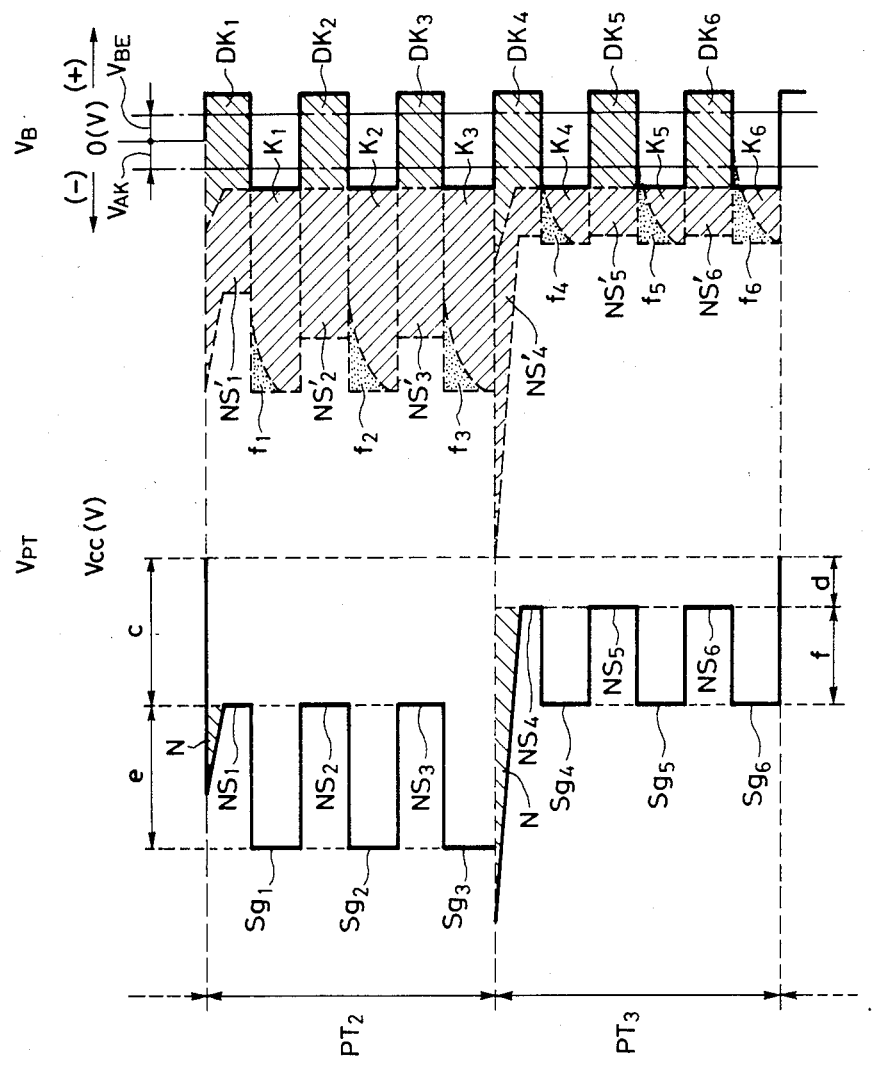
FIG. 3 is a diagram showing the waveform shaping operation by a waveform shaper in the circuit of FIG. 1.

A first preferred embodiment of the invention is hereinbelow described, referring to FIGS. 1 through 3 in which FIG. 1 is a circuit arrangement, FIG. 2 shows waveforms at different points of the circuit of FIG. 1, and FIG. 3 shows how a waveform shaper in the circuit of FIG. 1 shapes the waveforms of output signals of the light emitting elements.

In FIG. 1, reference numeral 1a refers to a drive circuit, 2 to a waveform shaper, 3a to an amplifier, 5b to a CPU, and 6a and 7a to first and second switching circuits.

The driving circuit 1a is activated by a drive signal a from the CPU which is a microprocessor. More specifically, the drive circuit 1a includes a transistor Q3 with its base supplied with the drive signal a, its collector supplied with a power source voltage from a power source terminal Vcc, and its emitter connected to the first switching circuit 6a which supplies a drive current to the light emitting diodes used as the light emitting elements.

The first switching circuit 6a includes switching elements SL1 through SLn which are sequentially closed one by one in response to a switching signal b from the CPU 5b. Each switching element has one end connected to the emitter of the transistor Q3 and the other end connected to the anode of an associated one of the light emitting diodes L1 through Ln.

The cathodes of the light emitting diodes L1 through Ln are connected to ground. Each of the light emitting diodes L1 through Ln selected by the switching signal b is energized by the drive circuit 1a, and a subsequent light emitting diode follows this in the order from L1 to Ln to sequentially produce light pulses. Light emitting diodes L1 through Lm are aligned in a line, and light emitting diodes Lm+1 through Ln are aligned in another line so that the light axes of the former are perpendicular to the light axes of the latter.

Photo transistors PT1 through PTn are aligned in two lines one of which involves photo transistors PT1 through PTm opposed to the light emitting diodes L1 through Lm and the other line involves photo transistors PTm+1 through PTn opposed to the light emitting diodes Lm+1 through Ln. Emitters of the photo transistors PT1 through PTn are connected to ground, and their collectors are each connected to one terminal of an associated one of switching elements S1 through Sn of the second switching circuit 7a. The other terminals of the switching elements S1 through Sn are connected to the waveform shaper 2.

More specifically, the output of the second switching circuit 7a is connected to the base of a transistor Q1 via a joining capacitor C1. The base of the transistor Q1 is connected to the cathode of a diode D1 whose anode is connected to ground. The base of the transistor Q1 is connected to the anode of a diode D2 and to the collector of a transistor Q2. The collector of the transistor Q1 is connected to the cathode of the diode D2 and to the emitter of the transistor Q2. The base of the transistor Q1 is further connected to one end of a resistor R5 which is connected to the power source terminal Vcc. The collector is connected to the power source terminal Vcc via resistors R1 and R2. The emitter of the transistor Q1 is connected to ground. The base of the transistor Q2 is supplied with the drive signal a from the CPU 5a via an amplifier provided in the waveform shaper 2.

The junction between the resistors R1 and R2 is connected to a capacitor C2 for bypassing an alternating current voltage change. The collector of the transistor Q1 as a signal output means of the waveform shaper 2 is connected to an amplifier 3a whose output is connected to the CPU 5b.

Between the collector of the transistor Q3 in the drive current 1a and the power source terminal Vcc is interposed in series a current limit resistor Rd and an inspection resistor 8a. The ends of the inspection resistor 8a are connected to the collector and base of a PNP transistor Q4 whose base is connected to a control terminal of the CPU 5b which produces a control signal c.

The circuit operates as follows when a coordinate input is entered. In this case, since the CPU 5 supplies the control signal c of low level to the base of the transistor Q4 to maintain the closed condition of the transistor Q4, the inspection resistor 8a is short-circuited.

The second switching circuit sequentially closes the switching elements S1 through Sn one by one upon reception of the switching signal b from the CPU 5b. The switching of the second switching circuit 7a is effected at the same timing as the supply of the switching signal b to the first switching circuit 6a, so that respective opposed pairs of light emitting diodes L1 through Ln photo transistors PT1 through PTn are concurrently activated.

When the drive signal a is supplied from the CPU 5b to the transistor Q3 of the drive circuit 1a, the light emitting diodes L1 through Ln are sequentially activated by a uniform current I. Therefore, the photo transistors PT1 through PTn receive light signals from the light emitting diodes L1 through Ln, and the current increases or decreases responsively to the light signals. At the same time, a pulse voltage waveform shown at $V_{PT}$ in FIG. 2 is produced due to the resistors R1 and R4. The voltage waveform $V_{PT}$ includes noise caused by the photoelectric transforming characteristics of the light emitting and receptor elements and external irregular light (light of the display, sun or illumination) and switching noise generated when the second switching circuit 7a switches the signals from the photo transistors PT1 through PTn.

One example of the pulse voltage waveform $V_{PT}$ including such noise is explained with respect to the photo transistors PT2 and PT3, referring to FIG. 3. The pulse voltage waveform $V_{PT}$ includes external light corresponding to the difference between c and d; a voltage difference caused by a variation in the light receiving characteristics of the photo transistors PT2 and PT3 and a variation of the light emitting characteristics of the light emitting diodes L2 and L3 corresponding to the difference between e and f; a voltage difference generated by the photo transistors PT2 and PT3; and a switching noise of the hatched waveform N generated when the second switching circuit 7a switches the photo transistors PT2 and PT3. The voltage difference and switching noise are included in all the signals from the photo transistors PT1 through PTn, and the levels are outputted at different values.

The pulse voltage waveform $V_{PT}$ including these voltage differences and switching noise is shaped into a waveform $V_B$ shown in FIG. 2 and FIG. 3.

More specifically, the second switching circuit 7a selects the photo transistor PT2 among others, a voltage based on the level (at c in FIG. 3) and a switching noise N corresponding to external irregular light as shown at NS1 in the $V_{PT}$ of FIG. 3 is detected and applied to the base of the transistor Q1 via the capacitor C1 of the waveform shaper 2. Due to the applied voltage, a potential difference is generated so that the base bias voltage applied to the base of the transistor Q1 from the power source terminal Vcc via the resistor R5 is shifted toward the minus direction. Due to the potential difference, the diode D1 receives a clamp current $I_{AK}$ as shown in FIG. 1. The electrical loop of the clamp current $I_{AK}$ passes through the capacitor C1 and the selectively closed switching element S2 of the second switching circuit 7a, flows from the collector of the photo transistor PT2 to the emitter connected to ground, and further passes through the anode and cathode of the grounded diode D1 to reach the other electrode of the capacitor C1.

In the potential difference entered via the capacitor C1 responsively to the clamp current $I_{AK}$, the hatched voltage component shown at NS'1 in FIG. 3 is corrected. The corrected potential difference is the sum of a voltage divided by a forward zener voltage $V_{AK}$ ($\mp$ 0.6 V) and the switching element S2 of the second switching circuit 7a; and a voltage division between the emitter and collector of the photo transistor PT2. The difference is produced by the value of the clamp current $I_{AK}$.

However, with the voltage corrected by the clamp current $I_{AK}$, it is not possible to supply a base current $I_B$ in the transistor Q1. In this connection, the corrected voltage is further corrected by a voltage supplied from the transistor Q2 responsively to the drive signal a. More specifically, the drive signal a at this time has a low level, and a voltage is supplied to the base of the transistor Q1 via the emitter and collector of the transistor Q2. This voltage corrects the hatched portion DK1 in FIG. 3 of the voltage $V_B$ corrected by the clamp current $I_{AK}$ to elevate it to the voltage level shown by a solid line to make the transistor conductive. As a result, the collector voltage of the transistor Q1 takes a low level. In this manner, the voltage waveform at NS1 of the voltage $V_{PT}$ in FIG. 3 is changed to a low level signal not including the external irregular light C and the switching noise N and supplied to the CPU 5b. The correcting action of the waveform shaper 2 is similarly effected for the portions NS2 through NS6 in the voltage $V_{PT}$ in FIG. 3, and shapes them as shown at DK2 through DK6 in the voltage $V_B$ in the same drawing.

On the other hand, as to the base current $I_B$ of the transistor Q1, the current supplied from the transistor Q2 does not exceed a predetermined value. The hatched portion shown at DK1 through DK6 in the voltage $V_B$ in FIG. 3 which is corrected by the current varies with the presence or absence of switching noises or other factors. This causes a variation in the input waveform produced when a subsequent entered collector voltage of the transistor Q1 becomes a high level, as shown at F1 and f4 (in presence of switching noises) and f2, f3, f5 and f6 (in absence of switching noises) in the voltage $V_B$ in FIG. 3.

In this connection, the excessively accumulated carrier is adjusted at a uniform value by a current dividing operation of a diode D2 connected between the base and collector of the transistor Q1. More specifically, due to the current dividing operation, part of the base current $I_B$ of the transistor Q1 flows from the collector to the emitter of the transistor Q1 via the diode D2 (see $I_{AK}$ in FIG. 1). Therefore, the base current $I_B$ of the transistor Q1 flows when the base voltage $V_B$ is a smaller one of a forward zener voltage ($V_{BE} \mp 0.6$ V) between the base and emitter of the transistor and the sum of a forward zener voltage ($V_{AK} \mp 0.6$ V) between the anode and cathode of the diode D2 and a voltage divided between the collector and emitter of the transistor Q1. This variation of the base current $I_B$ is substantially equal to a value generated by the voltage variation (0.003 to 0.12 V) divided between the collector and emitter by the transistor Q1, and the value of changes in the collector voltage may be disregarded.

A light pulse upon emission by the light emitting diode L2 among others is received by the associated photo transistor PT2, and a pulse voltage waveform $V_{PT}$ shown at Sq1 in FIG. 3 is obtained. The pulse voltage waveform Sq1 is a composite value of a component (c) largely shifted toward the minus direction by external irregular light and a component (e) shifted toward the minus direction by light from the light emitting diode L2. This voltage is applied to the base of the transistor Q1 via the capacitor C1 to cancel an excessive accumulated carrier component accumulated in the base of the transistor Q1 and drop the base voltage $V_B$. A potential difference generated thereby at both electrodes of the capacitor C1 causes a flow of the clamp current $I_{AK}$ in a direction shown by $I_{AK}$ in FIG. 1. The clamp current $I_{AK}$ corrects the hatched portion at DK1 in the voltage $V_B$ of FIG. 3 to clamp the base voltage $V_B$ to a fixed voltage level shown by a solid line. At this time, the drive signal a has a high level, and the voltage from the transistor Q2 is not applied to the base of the transistor Q1. Therefore, the base voltage $V_B$ is lower than the forward zener voltage $V_{BE}$ between the base and emitter of the transistor Q1, and the collector voltage has a high level, with no flow of the base current $I_B$ therein.

This operation also applies to the portions Sq2 through Sq6 shown in FIG. 3, so that the clamp current $I_{AK}$ corrects the hatched portions shown at K2 through K6 in the voltage $V_B$ of FIG. 3 to clamp the base voltage $V_B$ to a fixed voltage level shown by the solid line. As a result, the output of the waveform shaper 2 in the form of a pulse signal having a fixed level is obtained from the collector of the transistor Q1

The operation of the waveform shaper 2 is effected for all photo transistors PT1 through PTn, and the output signal from the waveform shaper 2 is applied to the CPU 5b via the amplifier 3a and transformed into a coordinate system signal which is subsequently outputted as positional information.

The operation of the device during a coordinate input is heretofore described. The subsequent description relates to how to inspect deterioration, etc. of the light emitting diodes L1 through Ln.

When an inspection signal d is entered in the CPU 5b, it is changed to its inspection mode and supplies a control signal of High level to the base of the transistor Q4. Therefore, the transistor Q4 is maintained at its closed condition, so that the inspection resistor 8a is activated between the power source terminal Vcc and the collector of the drive transistor Q3. The inspection resistor 8a drops the drive current I to the level of the inspection drive current I'. The inspection drive current I' is fixed by the resistance of the inspection resistor 8a so that non-deteriorated light emitting diodes emit the minimum level light.

With this arrangement, the CPU 5b effects its scanning operation in the same manner as described above, and supplies coordinate system information to the personal computer.

Therefore, if the light emitting diodes L2 and L3 are deteriorated or any dust rests thereon, their light emissions are reduced and decrease the output current from the associated photo transistors PT2 and PT3. Due to this, the output signal of the waveform shaper 2 drops below the threshold level, and the CPU 5b supplies a coordinate system signal indicating the positions of the photo transistors PT2 and PT3 to the personal computer. As a result, a coordinate position is displayed on the screen of the CRT display or other image display apparatus, and the user is informed of the deterioration of the light emitting diodes L2 and L3 or dust accumulation thereon, and can prevent a serious misoperation of the device.

Inspection of the light emitting diodes L1 through Ln may be done at regular or irregular intervals.

Figure 4A:
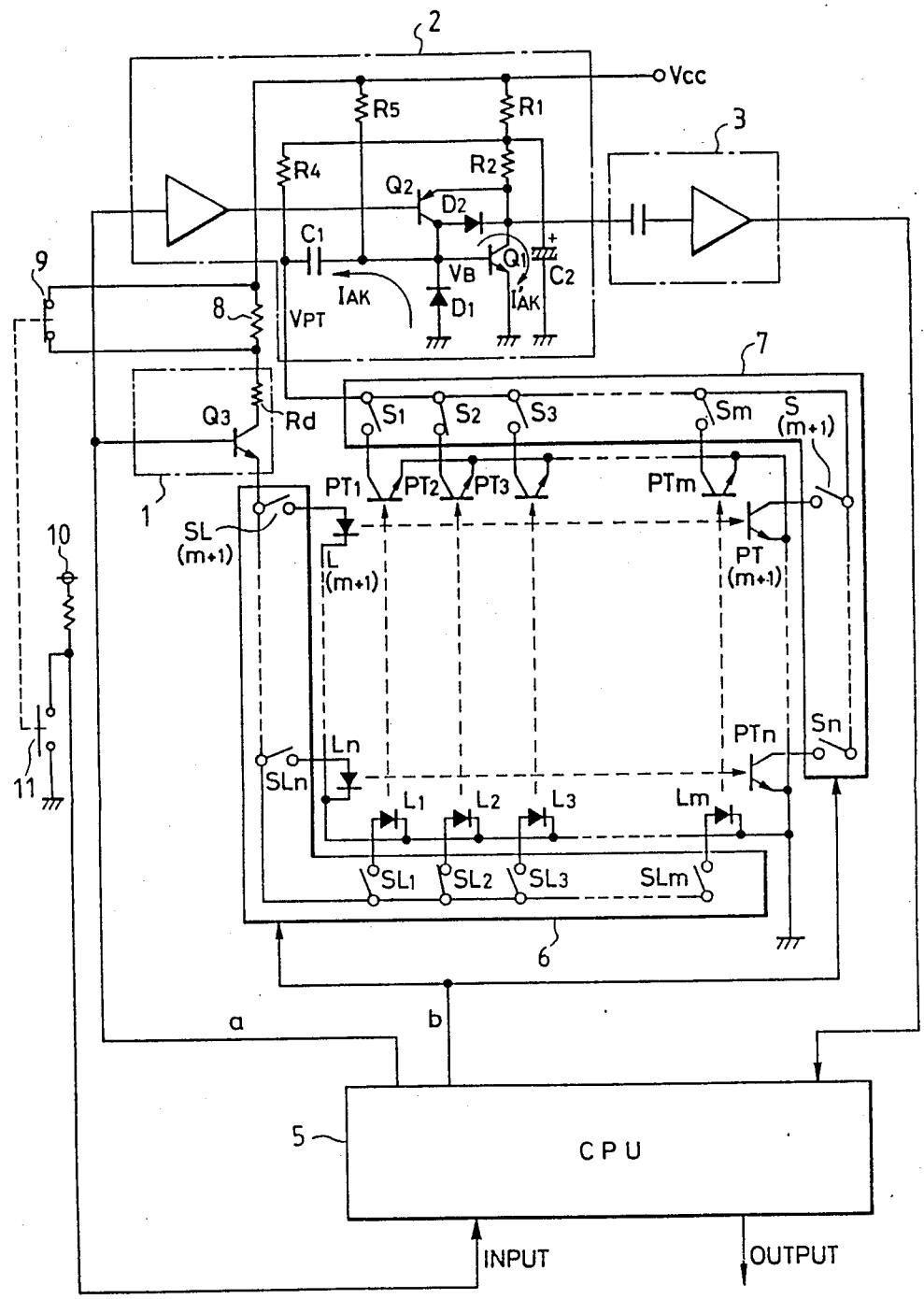
FIGS. 4a and 4b show two alternative circuit arrangements for a second embodiment of the invention.

FIG. 4a shows a further embodiment of the invention in which the inspection resistor 8a is short-circuited by a manually-operated first inspection switch 9. To the mode switching terminal of the CPU 5b is connected a power source 10 via a manually-operated second inspection switch 11. In the coordinate system input mode of the system, the first inspection switch 9 is closed to short-circuit the inspection resistor 8a, and the second inspection switch 11 is maintained open so that the CPU 5b receives the coordinate input mode signal of High level.

In the inspection mode of the device, the first inspection switch 9 is manually closed to connect the inspection resistor 8a to the collector of the drive transistor Q3. At the same time, the second inspection switch 11 is closed so that the CPU 5b receives the inspection mode signal of Low level.

In this embodiment, the inspection resistor 8a and transistor Q4 may be placed nearer to the transistor Q3, and the light emitting diodes L1 through Ln may be placed nearer to the ground connection.

The switching means to establish the short-circuit and connection of the inspection resistor 8 may be replaced by a relay or other means having a switching function.

Figure 4B:
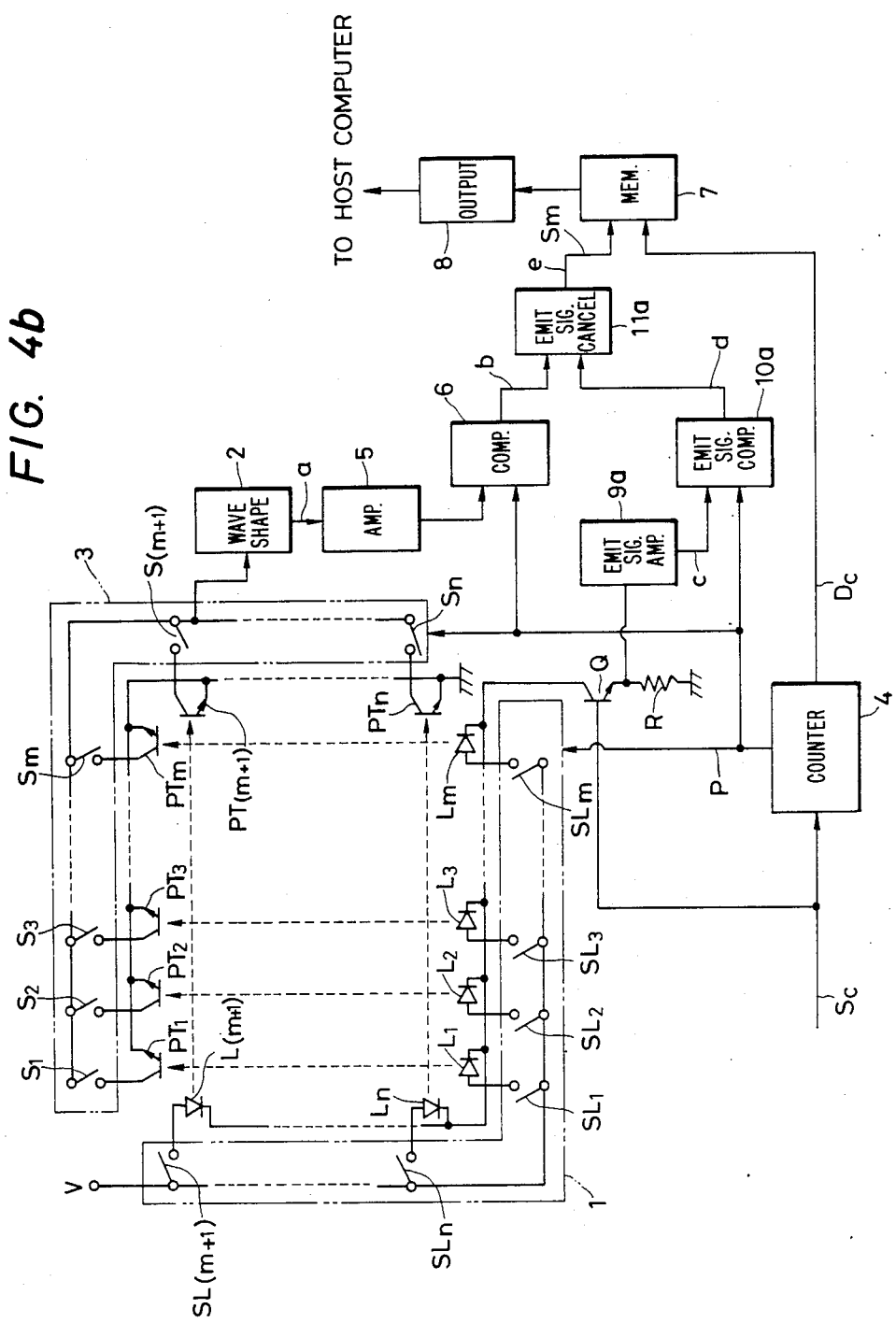
Figure 12:
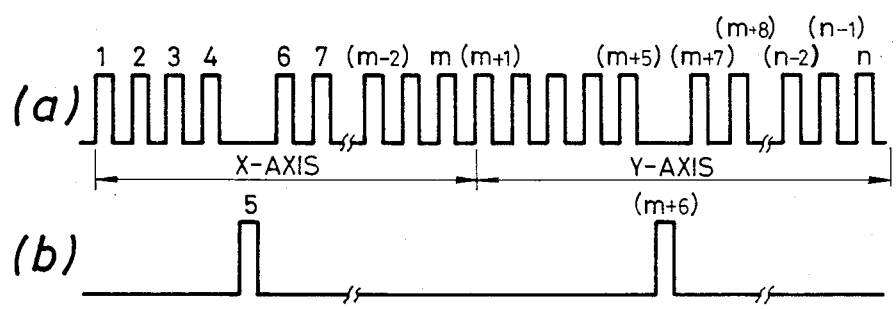
Figure 11:
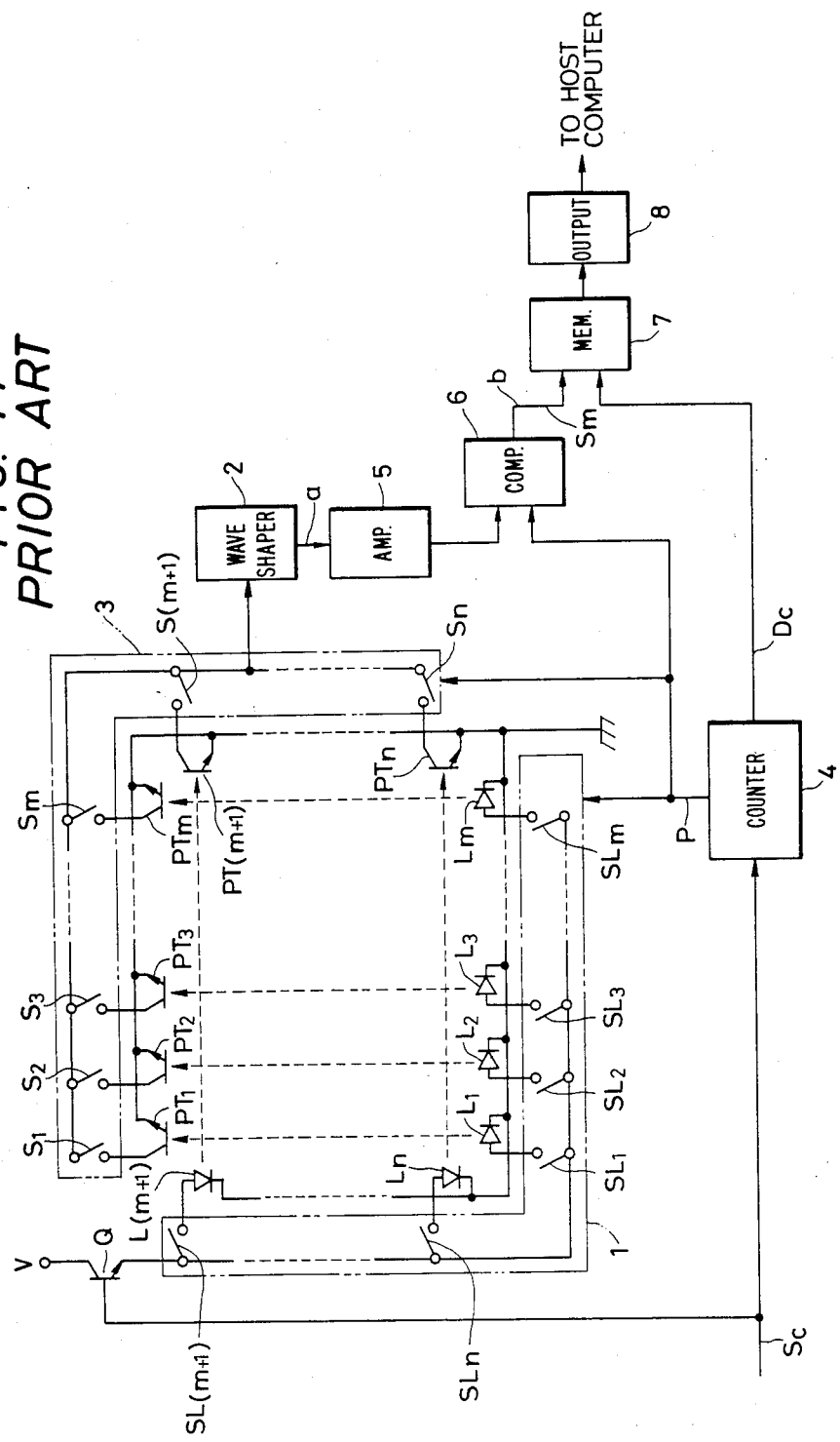

A second embodiment of the invention is hereinbelow described in detail, referring to FIGS. 4b and 5. FIG. 4b is a block circuit diagram of an optical coordinate system input device according to the invention, and FIG. 5 shows waveforms to explain the circuit of FIG. 4b. In these drawings, circuit components and waveforms the same as those of FIGS. 11 and 12 are designated by the same reference numerals, and redundant explanation is omitted here.

In FIG. 4b, normally opened switching elements SL1 through SLn each have one end connected to the anode of an associated one of the light emitting diode L1 through Ln, and have the other ends connected in common to the drive power source V. The cathodes of the light emitting diodes L1 through Ln are connected together, and their junction is further connected to the collector of a drive transistor Q. The emitter of the drive transistor is connected to ground via a resistor R. To the base of the drive transistor Q is applied a start signal Sc from a host computer. The emitters of the photo transistors PT1 through PTn are connected in common to ground.

A signal produced at the junction between the drive transistor Q and the resistor R is amplified by a light emission signal amplifier 9a and applied to a light emission signal comparator 10a. The comparator 10a receives a pulse signal P, and supplies a cancel signal to a cancel comparator 11a if it does not receive a signal from the light emission signal amplifier 9a at the moment when the pulse signal P is received. The cancel comparator 11a is supplied with a signal from the comparator 6 when the photo transistors PT1 through PTn do not receive light signals, and supplies a memory signal Sm to a memory 7 if no cancel signal is supplied at the moment when the signal form the cancel comparator 11a is received.

The circuit operates as explained hereinbelow, referring to FIG. 5. Assume here that a coordinate input produces "5" on the X axis and "m+6" on the Y axis, and that one of the light emitting diodes (Lm−1) corresponding to "m−1" on the X axis is in error, and does not produce a light signal, with no drive current flow therein.

The photo transistors PT5, PTm−1 and PTm+6 do not receive light signals, and the waveform shaper 2 supplies a signal lacking "5", "m−1" and "m+6" as shown at (a) in FIG. 5. This signal is compared to a pulse signal P in the comparator 6, and the comparator 6 supplies a signal of "5", "m−1" and "m+6" corresponding to the photo diodes PT5, PTm−1 and PTm+6 not receiving light signals as shown in FIG. 5(b). The light emission signal amplifier 9a amplifies the potential difference of the transistor R and supplies a signal shown in FIG. 5(c) lacking "m−1" corresponding to the light emitting diode Lm-1 in error. This signal is compared to the pulse signal P in the light emission signal comparator 10a which subsequently supplies a cancel signal of "m−1" corresponding to the light emitting diode Lm-1 in error. The output of the comparator 6 is compared to the output from the light emission signal comparator 10a in the cancel comparator 11a which supplies a memory signal Sm of "5" and "m+6" to the memory 7 if no cancel signal is supplied from the light emission signal comparator 10a at the moment when the comparator 6 supplies its output.

Therefore, the memory 7 is prohibited from storing count data Dc corresponding to "m−1" when the photo transistor PTm−1 does not receive a light signal due to malfunction of the light emitting diode Lm-1.

In the above-described embodiment, current is supplied to the light emitting diodes L1 through Ln via the resistor R with one end connected to ground, so that a detection means detects the presence or absence of a current flow in the light emitting diodes L1 through Ln from the voltage drop at both ends of the resistor. However, this arrangement may be replaced by any other detection means which reliably detects the flow or non-flow of current in the light emitting diodes L1 through Ln. The second embodiment is configured to obtain the memory signal Sm by operations of the comparator 6, light emission signal comparator 10a and cancel comparator 11a. However, it may be modified to obtain the memory signal Sm by an adequate logic circuit.

Figure 6:
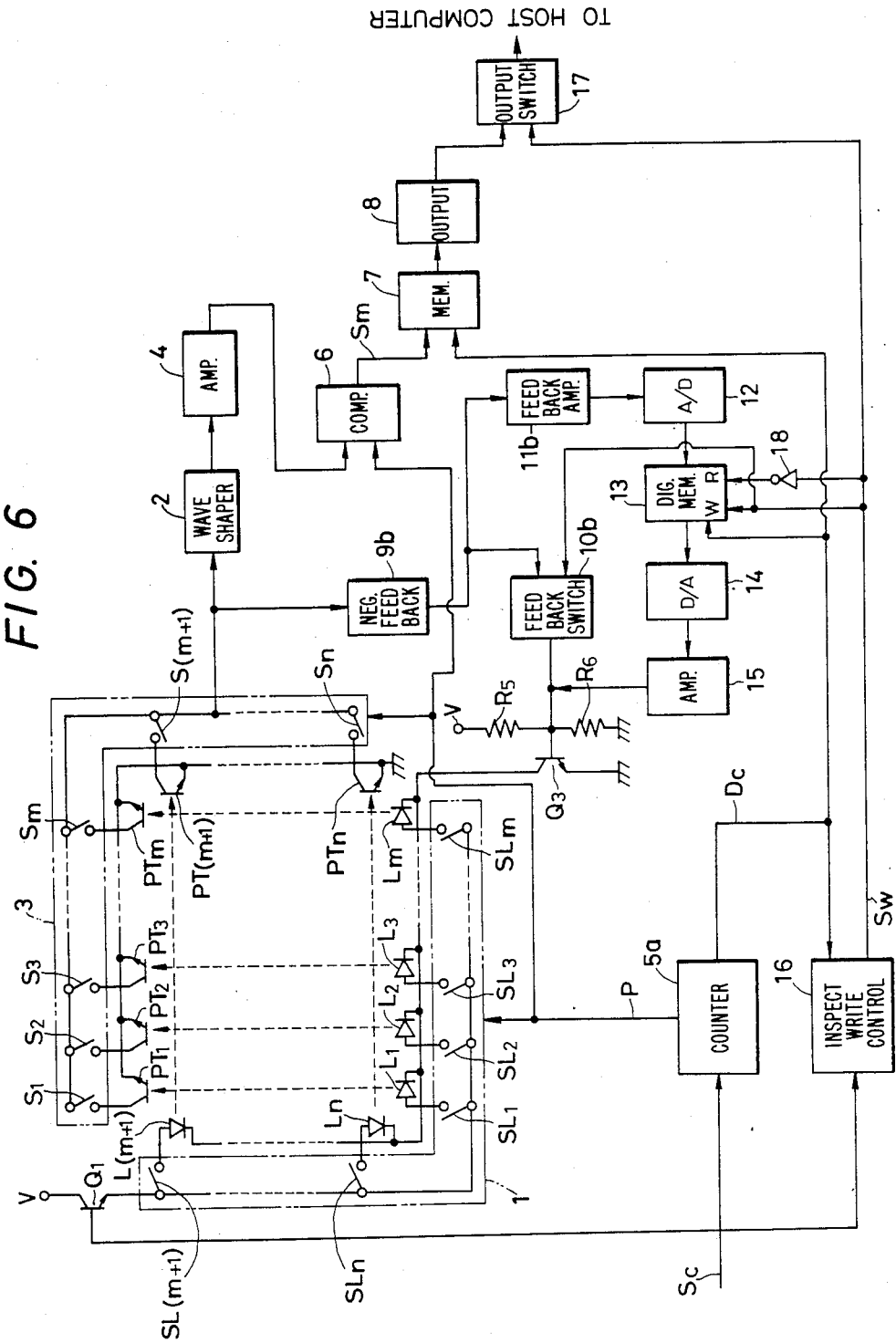
FIG. 6 is a circuit arrangement of a third embodiment of the invention.
Figure 13:
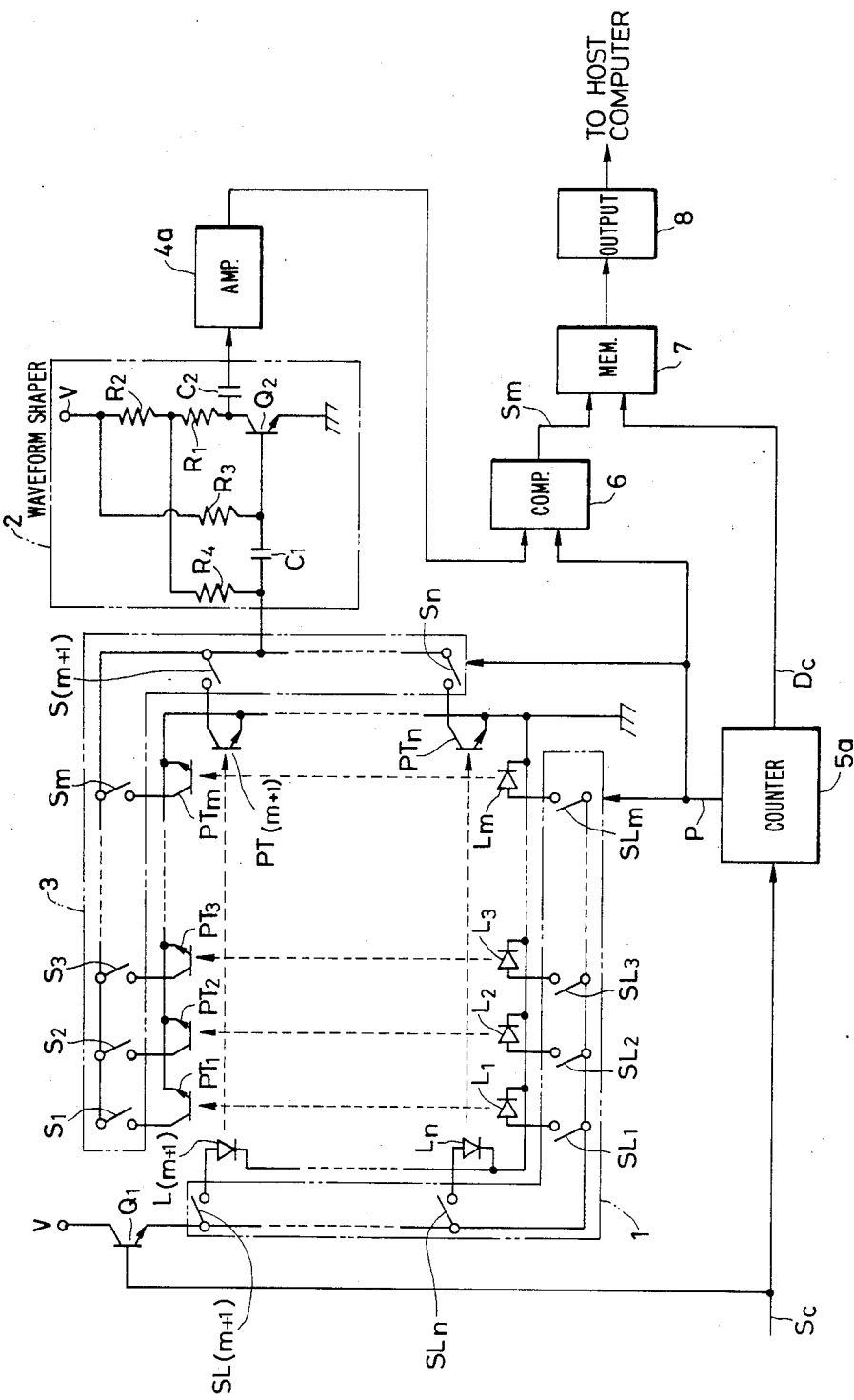

A third embodiment of the invention is hereinbelow described in detail, referring to FIG. 6 which is a block circuit diagram of an optical coordinate system input device according to the invention. In FIG. 6, circuit components equivalent to those of FIG. 13 are designated by the same reference numerals, and redundant explanation thereof is omitted here.

In FIG. 6, the cathodes of the light emitting diodes L1 through Ln are connected together, and their junction is connected to the collector of a transistor Q3 employed as a variable impedance circuit. The emitter of the transistor Q3 is connected to ground, and the base thereof is supplied with an adequate bias which is obtained by dividing the voltage of the drive power source V by resistors R5 and R6. Emitters of the photo transistors PT1 through PTn are connected in common to ground, and collectors thereof are connected to respective ends of switching elements S1 through Sn. The other ends of the switching elements S1 through Sn are connected together, and their junction is connected to the base of the transistor Q3 via a negative feedback control circuit 9b and a switching control circuit 10b connected in series to form a negative feedback circuit.

Part of the feedback amount of the negative feedback control circuit 9b is amplified in an amplifier 11b and converted to a digital signal by an analog-to-digital (A/D) converter 12. The digital signal is stored in a memory circuit 13 for every pair of light emitting diodes L1 through Ln and photo transistors PT1 through PTn, using the count data Dc as an address. A digital signal extracted from the memory circuit 13 is converted to feedback amount in the form of an analog signal by a digital-to-analog (D/A) converter 14, and applied to the base of the transistor Q2 after an adequate amplification in an amplifier 15.

A writing control circuit 16 is supplied with a start signal Sc produced from a host computer, and a count data Dc from a counter circuit 5a. During a first scanning, i.e. in one round of the count data Dc subsequent to application of the start signal Sc, the writing control circuit 16 supplies a writing signal Sw to the switching control circuit 10b, a memory circuit 13 and an output prohibit means 17 located at the output side of the output controller 8. The writing signal Sw is inverted by an inverter 18 and applied to the memory circuit 13 as a reading signal, too. The switching control circuit 10b having received the writing signal Sw transmits the feedback amount from the negative feedback controller 9b to the transistor Q3 to activate the negative feedback circuit. While the negative feedback circuit is activated, the memory circuit 13 stores the feedback amount for every pair of light emitting diodes L1 through Ln and photo transistors PT1 through PTn, using the count data Dc as an address. While the writing signal Sw is supplied, the output prohibit means 17 prohibits the output controller 8a from supplying a coordinate signal to the host computer.

When a second scanning is initiated after one round of the count data Dc, the writing control circuit 16 does not supply the writing signal, and the switching controller 10b inactivates the negative feedback circuit. A digital signal is extracted from the memory circuit 13 for every pair of light emitting diodes L1 through Ln and photo transistors PT1 through PTn, using the count data Dc as an address. The extracted signal is converted to analog signal by the D/A converter 14, and applied to the base of the transistor Q3 after adequate amplification in the amplifier 15. By adjusting the impedance of the transistor Q3, the output terminal voltages of the photo transistors PT1 through PTN in receipt of light signals are fixed at a uniform value. The output prohibit means 17 permits the output controller 8 to supply a coordinate signal to the host computer when the second scanning is initiated.

With this arrangement, during the first scanning at the beginning of the operation of the circuit where no coordinate input is entered yet, the feedback circuit is activated to adjust the impedance of the transistor Q3 so as to make the output terminal voltages of the photo transistors PT1 through PTn uniform upon receipt of light signals, and the feedback amount is stored in the memory circuit 13. While the negative feedback circuit is activated, the feedback amount changes until the output terminal voltage of the photo transistor becomes a uniform value, and the memory circuit stores the final feedback amount which has established the uniform value of the output terminal voltage. In and after the second scanning, the impedance of the transistor Q2 is adjusted by the final feedback amount stored and read out from the memory circuit 13. Therefore, the light emitting diodes L1 through Ln are activated so that the photo transistors PT1 through PTn in receipt of light signals never fail to produce a uniform value of output terminal voltage. During the first scanning, the waveform shaper 2 might produce an erroneous output due to changes in the output terminal voltage of the photo transistors PT1 through PTn. However, the output prohibit means 17 prohibits signal supply to the host computer.

In the described embodiment, the negative feedback circuit is configured to make the output terminal voltage of the photo transistors PT1 through PTn uniform upon by adjusting the impedance of the transistor Q3. However, it is not limited to this arrangement, but may be any other negative feedback circuit which appropriately controls the light emitting diodes L1 through Ln. The memory circuit 13 storing the feedback amount may be an analog signal memory instead of a digital signal memory. The storage of the feedback amount in the memory circuit 13 may be effected in any initial scanning at the beginning of the operation of the device and need not be effected during the first scanning.

Figure 7:
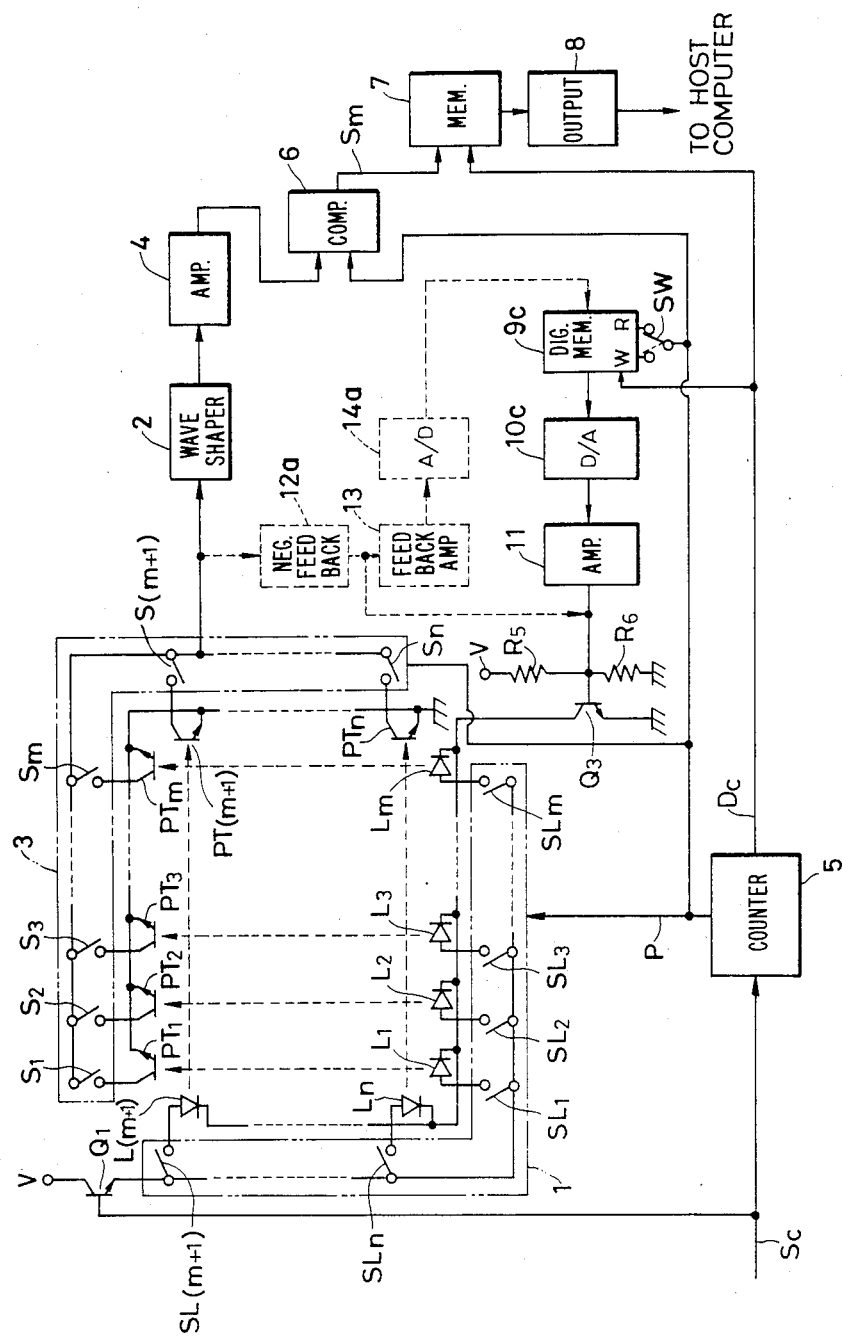
FIG. 7 is a circuit arrangement of a fourth embodiment of the invention.
Figure 14:
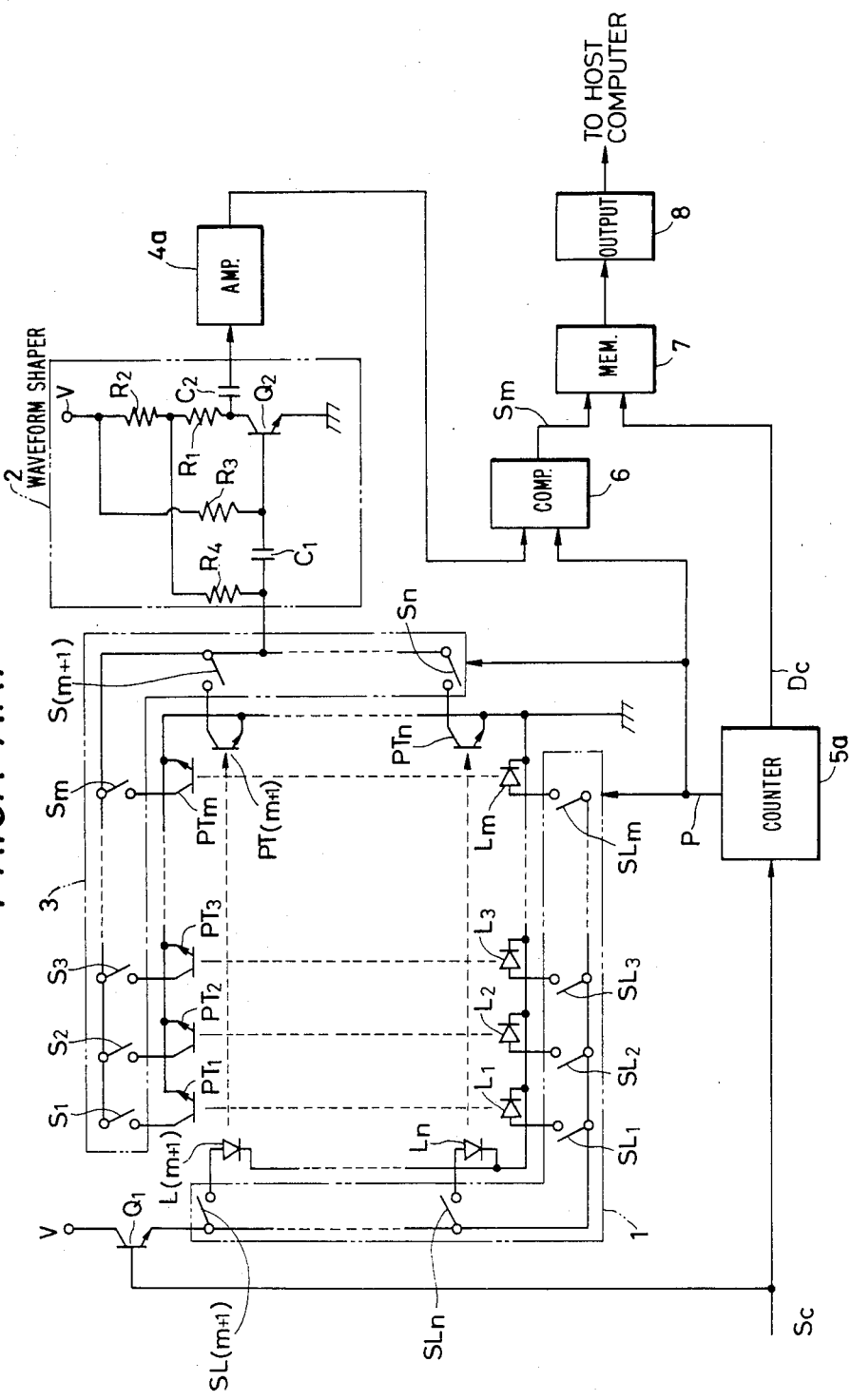

A fourth embodiment of the invention is now described in detail, referring to FIG. 7 which is a block circuit diagram of an optical coordinate system input device according to the invention. In FIG. 7, circuit components identical to those of FIG. 14 are designated by the same reference numerals, and redundant explanation is omitted here.

In FIG. 7, the cathodes of the light emitting diodes L1 through Ln are connected together, and their junction is connected to the collector of a transistor Q3 employed in the variable impedance circuit. The emitter of the transistor Q3 is connected to ground, and the base thereof is supplied with an appropriate bias obtained by dividing the voltage of the drive power source V by resistors R5 and R6. Emitters of the photo transistors PT1 through PTn are connected together to ground.

A nonvolatile memory circuit 9c is provided to originally store an adjusting signal, using as an address a count data Dc supplied from a counter circuit 5a for every pair of light emitting diodes L1 through Ln and photo transistor PT1 through PTn. Every time when a pulse signal P of the counter circuit 5a is applied to a reading terminal via a switch Sw, the adjusting signal is read out in response to first and second switching circuit 1 and 3, using the count data Dc as its address. The adjusting signal is a digital signal but converted to an analog signal by a D/A converter 10c and applied to the base of the transistor Q3 after appropriate amplification in an amplifier 11b. The adjusting signal originally stored in the memory circuit 9c is such that output terminal voltages of the photo transistors PT1 through PTn in receipt of light signal from the light emitting diodes L1 through Ln are fixed to a uniform value.

The adjusting signal is written in the memory circuit 9c in the manufacturing process of the device. One form of the writing method is hereinbelow explained. The conjoined other ends of the switching elements S1 through Sn, whose opposite ends are connected to the collectors of the photo transistors PT1 through PTn, are connected to the base of the transistor Q3 via a negative feedback control circuit 12a to form a negative feedback circuit. Part of the feedback amount of the negative feedback control circuit 12a is applied to an A/D converter 14a via an amplifier 13 and converted to a digital adjusting signal for application to the memory circuit 9c. Due to the operation of the negative feedback circuit, at every time when the output terminal voltage of the photo transistor PT1 through PTn takes a uniform value, the switch SW is temporarily switched to the writing terminal of the memory circuit 9c, using the count data Dc of the counter circuit 5a as an address, so that the adjusting signal is stored for every pair of light emitting diodes L1 through Ln and photo transistors PT1 through PTn. The negative feedback control circuit 12a, amplifier 13 and A/D converter 14a are merely used to write the adjusting signal in the memory circuit 9c, and they are removed when the device is shipped from the factory.

The storage of the adjusting signal in the memory circuit 9c may be effected by any adequate method other than the negative feedback circuit.

Figure 8:
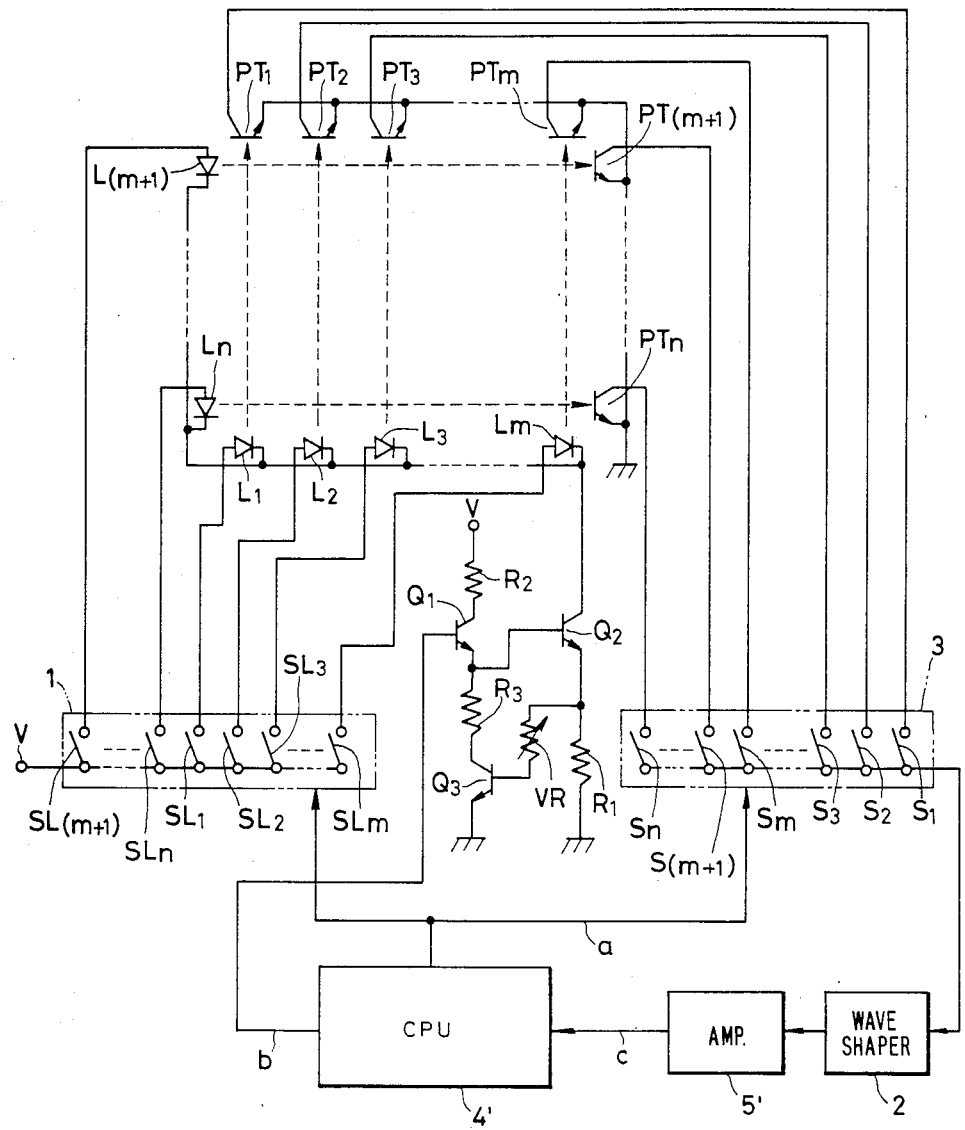
FIG. 8 is a circuit arrangement of a fifth embodiment of the invention.
Figure 15:
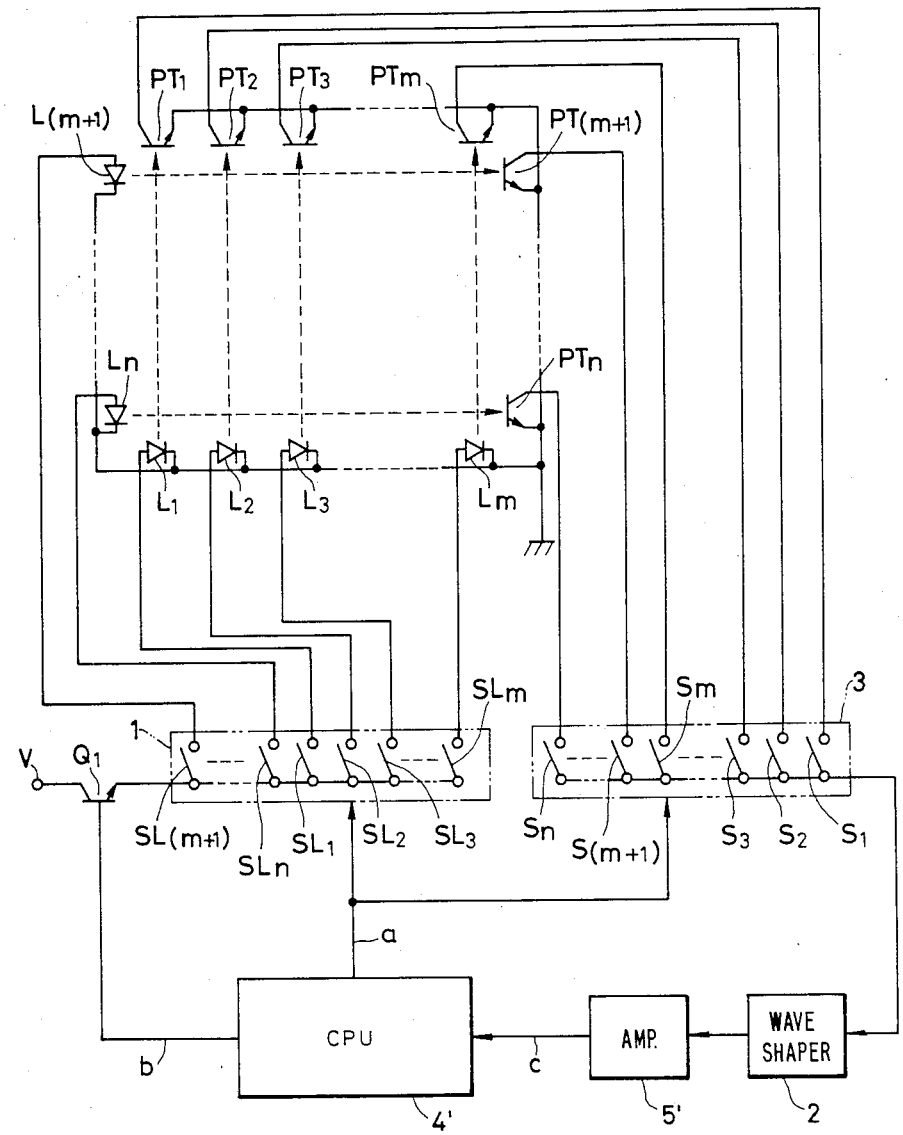

A fifth embodiment of the invention is hereinbelow described in detail, referring to FIGS. 8 through 10. FIG. 8 is a block circuit diagram of an optical positional input device according to the invention. In FIG. 8, circuit components identical to those of FIG. 15 are designated by the same reference numerals, and redundant explanation is omitted here.

In FIG. 8, normally opened switching elements SL1 through SLn have respective ends individually connected to anodes of light emitting diodes L1 through Ln and the other ends connected in common to a drive power source V. The cathodes of the photo diodes L1 through Ln are connected together, and their junction is connected to the collector of a control transistor Q2. The emitter of the control transistor Q2 is connected to ground via a resistor R1. The drive power source V is connected to the collector of a driving transistor Q1 whose emitter is connected to the base of the control transistor Q2 and to the collector of a negative feedback transistor Q3 via a resistor R3. The emitter of the negative feedback transistor Q3 is connected to ground, and the base thereof is connected to the emitter of the control transistor Q2 via a variable resistor VR. The base of the driving transistor Q1 is supplied with a drive signal b from a CPU 4'. Emitters of photo transistor PT1 through PTn are connected in common to ground.

With this arrangement, when the driving transistor Q1 is rendered conductive upon receipt of the drive signal b from the CPU 4, the control transistor Q2 is rendered conductive upon receipt of a voltage at the base thereof, so that a drive current flows in one of the light emitting diodes L1 through Ln selected by the first switching circuit 1. A potential difference generated at both ends of the resistor R1 by the drive current is applied to the base of the negative feedback transistor Q3 via the variable resistor VR to adjust the impedance of the negative feedback transistor Q3. As the result, the base of the control transistor Q2 is supplied with a voltage obtained by dividing the voltage of the drive power source V by resistors R2 and R3 and the negative feedback transistor Q3, so that the impedance of the control transistor Q2 is adjusted. If the drive current flowing in the selected one of the light emitting diodes L1 through Ln is larger than a predetermined value, a negative feedback circuit having an increased impedance of the control transistor Q2 is formed to make the drive current uniform. The value of the drive current may be adjusted by the variable resistor VR.

In this operation of the device, the light emitting diodes L1 through Ln are activated by a uniform fixed current and produce a fixed output of light signals, regardless of differences in the resistance of lead wires or patterns on the printed board to the drive current to the light emitting diodes L1 through Ln.

Figure 9:
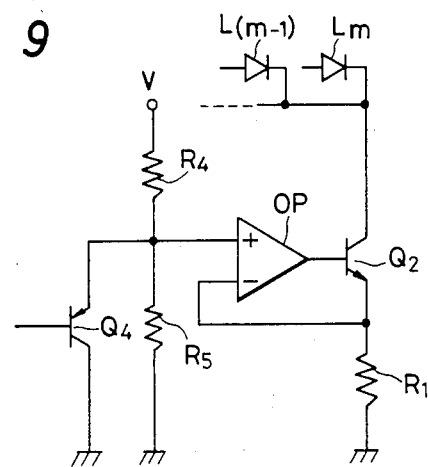
FIG. 9 is a circuit arrangement in a modified form of the fifth embodiment.
Figure 10:
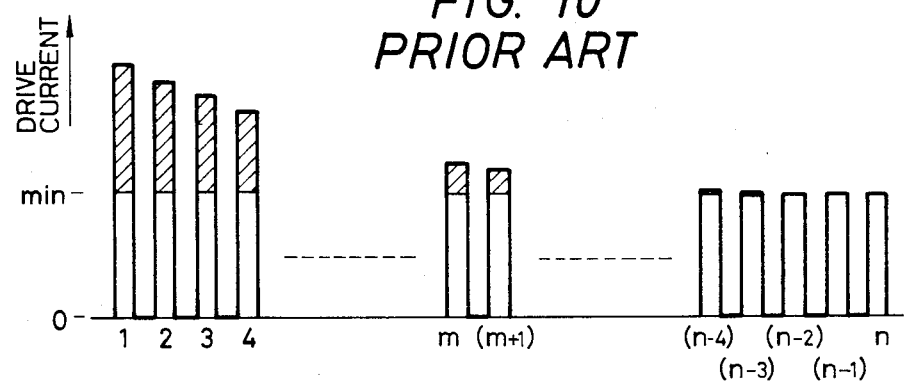
FIG. 10 through 15 show some forms of prior art optical coordinate system input device.

FIG. 9 is a fragmentary circuit diagram of a modification of the optical coordinate system input device according to the fifth embodiment.

In FIG. 9, the cathodes of the light emitting diodes L1 through Ln are connected in common to the collector of the control transistor Q2 whose emitter is connected to ground via the resistor R1. The drive power source V is connected to ground via series-connected resistors R4 and R5. The junction of the resistors R4 and R5 is connected to the plus input terminal of an operational amplifier OP and to the emitter of a driving transistor Q4 of a PNP transistor. The collector of the driving transistor Q4 is connected to ground, and the base thereof is supplied with a drive signal b from the CPU 4'. The emitter of the control transistor Q2 is connected to the minus input terminal of the operational amplifier OP.

With this arrangement, when the driving transistor Q4 is nonconductive on receipt of the drive signal b from the CPU 4', a voltage divided by the resistors R4 and R5 is applied to the operational amplifier OP to establish conduction of the control transistor Q2. A potential difference generated by the drive current flowing in the resistor R1 is applied to the operational amplifier OP which responsively adjusts the impedance of the control transistor Q2 to make the potential generated in the resistor R1 uniform. As the result, the drive current flowing in the light emitting diodes L1 through Ln is fixed at a uniform value.

Supply of a fixed current in the light emitting diodes L1 through Ln may be effected by any adequate means other than the negative feedback circuit.

The optical coordinate system input device including the above-described various adjusting means gives the following effects.

According to the first technical arrangement, during coordinate input, the switching means is closed to short-circuit the inspection resistor so that the drive circuit supplies a predetermined drive current to the light emitting elements. During inspection, the switching means is opened so that the inspection resistor limits the drive current to supply a limited drive current to the light emitting elements. Therefore, a user can reliably find deterioration or contamination of the light emitting elements by inspection at regular or irregular intervals. This permits omission of an attenuation filter and employs a simple circuit arrangement.

According to the second technical arrangement, the drive current flowing in the light emitting elements is detected to prohibit storage of the count data corresponding to a light emitting element in which no drive current flows due to its malfunction. Therefore, the memory does not store the count data when a light receptor element does not receive a light signal due to malfunction of the corresponding light emitting element. This means that a proper coordinate signal is obtained regardless of the presence of one or more malfunctioning light emitting elements. Therefore, maintenance of the device is very easy.

According to the third technical arrangement, since the output terminal voltage of the light emitting elements is fixed at a uniform voltage, no additional drive current in the light emitting elements is required in excess of the amount necessary for generation of a light signal, and this reduces deterioration of the light emitting elements and decreases the power consumption.

According to the fourth technical arrangement, the output terminal voltage of the light emitting elements is fixed at a uniform value regardless of variation in the characteristics of the light emitting elements and light receptor elements. Therefore, no additional drive current in the light emitting elements is required in excess of the amount necessary for generation of a light signal. This reduces deterioration of the light emitting elements and decreases the power consumption of the device. Further, since the adjusting signal is originally stored in the memory circuit, the circuit arrangement is very simple.

According to the fifth technical arrangement, the light emitting elements are activated by a fixed uniform current and generate a fixed amount of light signal. Since no excessive drive current flows in the light emitting diodes, deterioration of the light emitting elements is reduced, and their life is prolonged. Further, the power consumption of the device is much smaller than the prior art device.

What is claimed is:

1. In an optical coordinate system input device including a plurality of light emitting elements, a plurality of light receptor elements each paired opposite a corresponding one of said light emitting elements, a drive circuit for supplying said light emitting elements with a drive current, a switching circuit for sequentially connecting said drive circuit to each of said light emitting elements in turn so as to drive them to emit respective light signals to the corresponding ones of said light receptor elements, and coordinate detecting means for detecting a respective output terminal voltage of each one of said light receptor elements and, when any one of said light receptor elements does not receive a light signal emitted from the corresponding one of said light emitting elements, for generating a coordinate position signal in response thereto, the improvement comprising:
a variable impedance circuit connected in series to each of said light emitting elements;
a negative feedback circuit for adjusting said variable impedance circuit to render the output terminal voltage for each light receptor element at a uniform level, including: a negative feedback control circuit which, during a feedback determination mode, is responsive to the output terminal voltage of each light receptor element when a corresponding light signal is received for determining a feedback amount for adjusting said variable impedance circuit to render the output terminal voltage of each light receptor element at the uniform level; and a memory circuit for storing the feedback amount determined by said negative feedback control circuit for each pair of corresponding light emitting and receptor elements; and
said switching circuit having means for activating said negative feedback circuit and initially scanning said pairs of light emitting and receiving elements in said feedback determination mode to cause said negative feedback circuit to determine the feedback amounts and said memory circuit to store said feedback amounts, and for deactivating said negative feedback circuit and subsequently scanning said pairs of light emitting and receiving elements in a normal operation mode and causing the feedback amounts to be read out from said memory circuit in order to adjust said variable impedance circuit.

2. An optical coordinate system input device of claim 1 wherein said negative feedback circuit includes an analog-to-digital converter circuit for converting said feedback amount to a digital signal for storage in said memory circuit, and a digital-to-analog circuit for converting the digital signal taken from said memory circuit into an analog signal for adjustment of said variable impedance circuit.

3. An optical coordinate system input device of claim 1 or 2 wherein said memory circuit stores said feedback amount during a first scanning at the beginning of operation of the device, and the feedback amount is read out from the memory circuit during a second or any subsequent scanning to adjust the variable impedance circuit.

4. In an optical coordinate system input device including a plurality of light emitting elements, a plurality of light receptor elements each paired opposite a corresponding one of said light emitting elements, a drive circuit for supplying said light emitting elements with a drive current, a switching circuit for sequentially connecting said drive circuit to each of said light emitting elements in turn so as to drive them to emit respective light signals to the corresponding ones of said light receptor elements, and coordinate detecting means for detecting a respective output terminal voltage of each one of said light receptor elements and, when any one of said light receptor elements does not receive a light signal emitted from the corresponding one of said light emitting elements, for generating a coordinate position signal in response thereto, the improvement comprising:
a variable impedance circuit connected in series to each of said light emitting elements;
a memory circuit for originally storing a feedback amount for adjusting said variable impedance circuit to render the output terminal voltage of each light receptor element at a uniform level upon receipt of a light signal from the corresponding light emitting element; and
said switching circuit having means for causing the feedback amounts to be read out from said memory circuit in order to adjust said variable impedance circuit.

5. An optical coordinate system input device of claim 1 wherein said adjusting signal is stored in the memory circuit in the form of a digital signal, and a digital-to-analog converter circuit converts the digital adjusting signal read out from the memory circuit to an analog signal for application to said variable impedance circuit.

6. In an optical coordinate system input device including a plurality of light emitting elements, a plurality of light receptor elements each paired opposite a corresponding one of said light emitting elements, a drive circuit for supplying said light emitting elements with a drive current, a switching circuit for sequentially connecting said drive circuit to each of said light emitting elements in turn so as to drive them to emit respective light signals to the corresponding ones of said light receptor elements, and coordinate detecting means for detecting a respective output terminal voltage of each one of said light receptor elements and, when any one of said light receptor elements does not receive a light signal emitted from the corresponding one of said light emitting elements, for generating a coordinate position signal in response thereto, the improvement comprising:
a current limiting means for limiting said drive current to a reduced inspection value during an inspection mode;
a drive current switching means for switching said drive current to a normal value during a normal operation mode, and to said inspection value of said current limiting means during said inspection mode; and
means for discriminating during said inspection mode when a light receptor element is deteriorated based upon the output terminal voltage of the light receptor element when said drive current switching means applies said drive current of the reduced inspection value thereto.

7. An optical coordinate system input device according to claim 6, wherein said current limiting means is a resistor connected in series between said drive circuit and said light emitting elements.

8. In an optical coordinate system input device including a plurality of light emitting elements, a plurality of light receptor elements each paired opposite a corresponding one of said light emitting elements, a drive circuit for supplying said light emitting elements with a drive current, a switching circuit for sequentially connecting said drive circuit to each of said light emitting elements in turn so as to drive them to emit respective light signals to the corresponding ones of said light receptor elements, and coordinate detecting means for detecting a respective output terminal voltage of each one of said light receptor elements and, when any one of said light receptor elements does not receive a light signal emitted from the corresponding one of said light emitting elements, for generating a coordinate position signal in response thereto, the improvement comprising:
a counter circuit for outputting a count data signal to said switching circuit for switching the drive current to each of said light emitting elements in turn;
memory means for storing a coordinate position signal in correspondence with the count data signal from said counter circuit when said coordinate detecting means detects that a light receptor element has not received the light signal from the corresponding light emitting element;
sensor means for detecting the drive current energized through each of said light emitting elements; and
prohibiting means for prohibiting the storing of an erroneous coordinate position signal in said memory means when said sensor means does not detect a drive current through the corresponding light emitting element.

9. An optical coordinate system input device according to claim 8, wherein said sensor means includes a resistor connected in series between said drive circuit and said light emitting elements for detecting the drive current energized therethrough.

10. In an optical coordinate system input device including a plurality of light emitting elements, a plurality of light receptor elements each paired opposite a corresponding one of said light emitting elements, a drive circuit for supplying said light emitting elements with a drive current, a switching circuit for sequentially connecting said drive circuit to each of said light emitting elements in turn so as to drive them to emit respective light signals to the corresponding ones of said light receptor elements, and coordinate detecting means for detecting a respective output terminal voltage of each one of said light receptor elements and, when any one of said light receptor elements does not receive a light signal emitted from the corresponding one of said light emitting elements, for generating a coordinate position signal in response thereto, the improvement comprising:
a variable impedance circuit connected in series to each of said light emitting elements;
a negative feedback circuit for adjusting said variable impedance circuit to render the drive current through each of said light emitting elements at a uniform level, and said variable impedance circuit having a control transistor having its collector connected in series to said light emitting elements and its emitter connected at a first junction to a first resistor, a feedback transistor having its base connected through a variable resistor to said first junction and its collector connected to a second resistor, and a driving transistor having its collector connected through a third resistor to a power source, its emitter connected through said second resistor to said collector of said feedback transistor, and its base connected to receive a drive signal to render its conducting, wherein the impedance value of said control transistor is adjusted by the negative feedback applied to the base thereof by dividing the voltage of the power source by the second and third resistors and by the negative feedback impedance of the feedback transistor so that the drive current through the light emitting elements is kept at the uniform level, and wherein the value of the drive current kept uniform through the control transistor is adjusted by said variable resistor.

* * * * *

UNITED STATES PATENT AND TRADEMARK OFFICE
CERTIFICATE OF CORRECTION

PATENT NO. : 4,812,642

DATED : March 14, 1989

INVENTOR(S) : Kazuo Hasegawa; Junichi Ohuchi; Hiroaki Sasaki

It is certified that error appears in the above-identified patent and that said Letters Patent is hereby corrected as shown below:

Foreign Application Priority Data

Include Priority Data: June 30, 1986 (JP) Japan 61-153173

In the Claims

Claim 5, Col. 22, line 52, "Claim 1" should be --Claim 4--.

Signed and Sealed this

Seventeenth Day of October, 1989

Attest:

DONALD J. QUIGG

Attesting Officer

Commissioner of Patents and Trademarks